United States Patent
Thome et al.

(10) Patent No.: US 7,358,892 B2
(45) Date of Patent: Apr. 15, 2008

(54) SYSTEM AND METHOD FOR COHERENTLY COMBINING A PLURALITY OF RADARS

(75) Inventors: George D. Thome, Sudbury, MA (US); Robert P. Enzmann, Weston, MA (US); Fritz Steudel, Pocasset, MA (US)

(73) Assignee: Raytheon Company, Waltham, MA (US)

( * ) Notice: Subject to any disclaimer, the term of this patent is extended or adjusted under 35 U.S.C. 154(b) by 40 days.

(21) Appl. No.: 11/376,934

(22) Filed: Mar. 16, 2006

(65) Prior Publication Data
US 2006/0220951 A1 Oct. 5, 2006

Related U.S. Application Data

(60) Provisional application No. 60/668,137, filed on Apr. 4, 2005.

(51) Int. Cl.
G01S 7/40 (2006.01)
G01S 13/00 (2006.01)

(52) U.S. Cl. ............... 342/174; 342/59; 342/165; 342/173; 342/175; 342/195

(58) Field of Classification Search .......... 342/59, 342/82–103, 165–175, 195
See application file for complete search history.

(56) References Cited

U.S. PATENT DOCUMENTS

| | | | |
|---|---|---|---|
| 3,128,466 | A | 4/1964 | Brown et al. |
| 3,316,549 | A | 4/1967 | Hallendorff |
| 3,569,965 | A | 3/1971 | Bagley |
| 3,858,214 | A | 12/1974 | Jones, Jr. |
| 3,938,148 | A | 2/1976 | Hobson |
| 3,940,767 | A | 2/1976 | DeLano et al. |
| 4,011,564 | A | 3/1977 | Gulick, Jr. |
| 4,190,837 | A | 2/1980 | Salvaudon et al. |
| 4,212,012 | A | 7/1980 | Manoogian et al. |
| 4,241,889 | A | 12/1980 | Schwellinger et al. |

(Continued)

FOREIGN PATENT DOCUMENTS

DE 102 52 091 A1 5/2004

(Continued)

OTHER PUBLICATIONS

Hoffman; et al.; "Four-Channel Monopulse for Main Beam Nulling and Tracking;" XP000697852; Proceedings of the IEEE National Radar Conference, New York; May 13, 1997; pp. 94-98.

(Continued)

*Primary Examiner*—Bernarr E. Gregory
(74) *Attorney, Agent, or Firm*—Daly, Crowley, Mofford & Durkee, LLP

(57) ABSTRACT

Systems and techniques for coherent combining radars include generating a phase and range calibration and initialization values for adjusting a time delay and a phase of a transmitted pulse from one of the radars, resulting in received composite target echoes at each of the radars having contributions from monostatic and bistatic echoes. The method further includes predicting phase and range correction values for further adjusting the time delay and the phase of subsequent radar pulses transmitted by one of the radars to continue to result in received composite target echoes at each of the radars. The method further includes coherently summing the composite target echoes.

22 Claims, 15 Drawing Sheets

U.S. PATENT DOCUMENTS

| | | | |
|---|---|---|---|
| 4,256,275 | A | 3/1981 | Flick et al. |
| 4,290,066 | A | 9/1981 | Butler |
| 4,303,211 | A | 12/1981 | Dooley et al. |
| 4,586,044 | A | 4/1986 | Hopwood et al. |
| 4,688,042 | A | 8/1987 | Cronson et al. |
| 4,766,435 | A | 8/1988 | Wells |
| 4,968,967 | A | 11/1990 | Stove |
| 5,163,176 | A | 11/1992 | Flumerfelt et al. |
| 5,345,239 | A | 9/1994 | Madni et al. |
| 5,400,035 | A | 3/1995 | Liu |
| 5,673,051 | A | 9/1997 | Nussbaum et al. |
| 6,225,942 | B1 | 5/2001 | Alon |
| 6,295,017 | B1 | 9/2001 | Ivanov et al. |
| 6,320,541 | B1 | 11/2001 | Pozgay et al. |
| 6,359,586 | B1 | 3/2002 | Sviestins |
| 6,518,917 | B1 | 2/2003 | Durfee et al. |
| 6,545,633 | B1 | 4/2003 | Jensen |
| 7,138,941 | B1 * | 11/2006 | Smith, Jr. .................. 342/174 |
| 7,183,969 | B2 * | 2/2007 | Pozgay et al. ............. 342/174 |
| 7,209,072 | B2 * | 4/2007 | Braubach et al. ............. 342/59 |

FOREIGN PATENT DOCUMENTS

| | | |
|---|---|---|
| EP | 1 426 785 A3 | 6/2004 |
| GB | 2 292 493 A | 2/1996 |
| WO | WO 2006/068888 A1 | 6/2006 |

OTHER PUBLICATIONS

Pozgay et al.; "System and Technique for Calibrating Radar Arrays;" U.S. Appl. No. 11/022,028, filed Dec. 22, 2004.

Sherman; "Monopulse Principles and Techniques;" XP-002148537, Section 12.2 "The Diagonal Difference Signal;" Dedham Artech House Inc. 1984; pp. 339-343.

PCT Search Report of the ISA for PCT/US00/03892 dated Oct. 13, 2000.

Weib; "Synchronisation of Bistatic Radar Systems;" 0-7803-8743; IEEE; Feb. 2004; pp. 1750-1753.

PCT Search Report and Written Opinion of the ISA for PCT/US2006/009537 dated Jul. 17, 2006.

* cited by examiner

Before Radar Calibration Corrections

After Applying Phase Calibration Correction to Paired Radar

After Applying Range Calibration Correction to Paired Radar

Apply Phase & Range Initialization Values and
Phase & Range Calibration Values to Paired Radar Measure Residual Phase Error Generate/Update Composite Signal Phase Relationship Between Composite Signals to Predict Phase for Next Pulse Add Composite Signals with Predicated Phase Difference

SYSTEM AND METHOD FOR COHERENTLY COMBINING A PLURALITY OF RADARS

CROSS REFERENCE TO RELATED APPLICATIONS

This application claims the benefit under 35 U.S.C. §119 (e) of U.S. Provisional Application No. 60/668,137 filed Apr. 4, 2005, which application is incorporated herein by reference in its entirety.

STATEMENT REGARDING FEDERALLY SPONSORED RESEARCH

Not Applicable.

FIELD OF THE INVENTION

This invention relates generally to radar systems and methods, and, more particularly, to a system and method for coherently combining a plurality of radars.

BACKGROUND OF THE INVENTION

As is known, a single radar has a theoretical maximum signal to noise ratio (SNR) for a given size target at given range. The signal to noise ratio directly affects the ability of the radar to detect, track, and identify the target. The maximum signal to noise ratio is determined by a variety of radar characteristics, including but not limited to, the size of the radar antenna, the radar transmit power, and the radar receiver noise level. Each of these radar characteristics is substantially fixed for any particular radar. Therefore, in order to improve detection, tracking, or target identification performance, it has generally been necessary to design a new radar having new radar characteristics. Redesign of a new radar is a very long and expensive process and makes no use of existing radars.

Alternatively, it is possible to process together received signals from a plurality of radars (e.g., existing radars), each radar having a separate antenna, in order to increase the sensitivity of the combined system (i.e., to increase SNR for a given size target at a given range), and therefore, to increase detection, tracking, or target identification performance.

In order to process together the received signals, i.e., the target echoes from the plurality of radars, it is advantageous that the target echoes received by each of the plurality of radars be combined together coherently with the no relative phase difference. In this way, the improvement in radar sensitivity provided by the plurality of radars, compared with any one radar, is improved by the greatest amount.

One of ordinary skill in the art will understand that knowledge of the relative position of the radar antenna of each one of the plurality of radars to within a small fraction of a wavelength can allow phase corrections having sufficient accuracy to allow coherent in-phase processing. However, it is generally not sufficient that the position of the radar antennas merely be mechanically measured, since the distance between the radar antennas can be quite large compared to a wavelength, resulting in measurement inaccuracy. Furthermore, knowing only the mechanical separation between the radars is not sufficient since it does not account for internal electrical differences in time delay or phase shift between radars. Measurement of mechanical separation also does not account for a change in these electrical parameters with time due to temperature changes, aging, parts replacement, etc.

It would be useful to provide the above-described plurality of radars as mobile radars. However, mobile radars are subject to changes in relative position much greater than a wavelength, and therefore, calibration of relative position of mobile radar antennas would have to be performed each time the mobile radars are moved.

One of ordinary skill in the art will understand that calibrating the relative positions of a plurality of radar arrays is difficult and subject to increasing errors as the separation of the plurality of radar antennas increases. It will also be understood that such calibration is a separate process, requiring substantial time apart from actual operation of the radars.

When transmitting with a plurality of radars, for example, two radars, toward a target, each radar receives a monostatic target echo corresponding to its transmitted radar signal, and a bistatic target echo corresponding to a transmitted radar signal from the other radar. One of ordinary skill in the art will recognize that, if both the monostatic and the bistatic target echoes are received by each radar and processed together coherently, additional system sensitivity can be achieved beyond that achieved if only the monostatic target echoes are processed. However, the monostatic and bistatic target echoes received by each radar generally appear at different ranges (time delays) and with different phases, and therefore, do not generally sum coherently with no phase difference.

SUMMARY OF THE INVENTION

The present invention provides a system and method for coherent in-phase combining of a plurality of radars. The system and method do not require knowledge of the relative position of the two or more radars.

In accordance with the present invention, a method of calibrating a plurality of radars includes selecting a reference radar from among the plurality of radars, and selecting one or more pairs of radars, each one of the pairs of radars including the reference radar and a respective paired radar from among the plurality of radars. The method also includes generating calibration values associated with the reference radar and with the paired radar and generating initialization values associated with the reference radar and with the paired radar. The method still further includes transmitting an adjusted signal with the paired radar and an unadjusted signal with the reference radar, the adjusted signal generated in accordance with the initialization values and the calibration values. A first composite signal is received with the reference radar and a second composite signal is received with the paired radar, which are associated with the adjusted signal and the unadjusted signal. The method coherently sums the first composite signals and second composite signal to provide a cohered signal. With this particular arrangement, the method can cohere the plurality of radars to provide improved signal gain.

In accordance with another aspect of the present invention, an apparatus for calibrating a plurality of radars includes an association processor for associating at least one respective target track provided by each of a pair of radars from among the plurality of radars including a reference radar and a paired radar. The apparatus also includes a calibration processor coupled to the association processor for providing calibration values associated with the pair of radars, an initialization processor coupled to the calibration processor for providing initialization values associated with the pair of radars, and a coherence maintenance processor coupled to the initialization processor to adjust at least one of a first signal transmitted by the reference radar and a second signal transmitted by the paired radar in accordance with the initialization values and with the calibration values, and to coherently sum a first composite signal received by the reference radar with a second composite signal received by the paired radar. With this particular arrangement, the apparatus can cohere the plurality of radars providing improved signal gain.

BRIEF DESCRIPTION FO THE DRAWINGS

The foregoing features of the invention, as well as the invention itself may be more fully understood from the following detailed description of the drawings, in which.

DETAILED DESCRIPTION OF THE INVENTION

Before describing the system and method of the present invention, some introductory concepts and terminology are explained. As used herein, the term "reference radar" is used to describe one radar selected from among a group of two or more radars. As used herein, the term "paired radar" is used to describe any radar other than the reference radar selected from among the group of two or more radars.

While much of the discussion below describes but one paired radar, it should be appreciated that there can be any number of paired radars, and the same apparatus and methods described below can apply to each paired radar. The reference radar and the paired radar described below can be different types of radars. The paired radar is sometimes referred to herein as "radar 1" and the reference radar is sometimes referred to herein as "radar 2."

As used herein, the terms "range" and "time delay" are sometimes used synonymously. One of ordinary skill in the art will understand that a radar system uses time delay between transmission of a radar pulse and reception of a corresponding target echo to determine a range to the target.

As used herein, the terms "composite signal," "composite echo," and "composite return" are used to refer to radar signals at the same frequency that are received at the same time so that they overlap and add. In particular, the terms "composite signal," "composite echo," and "composite return" are used to describe monostatic and bistatic target echoes that arrive at a radar at the same time so as to overlap and add.

Figure 1:
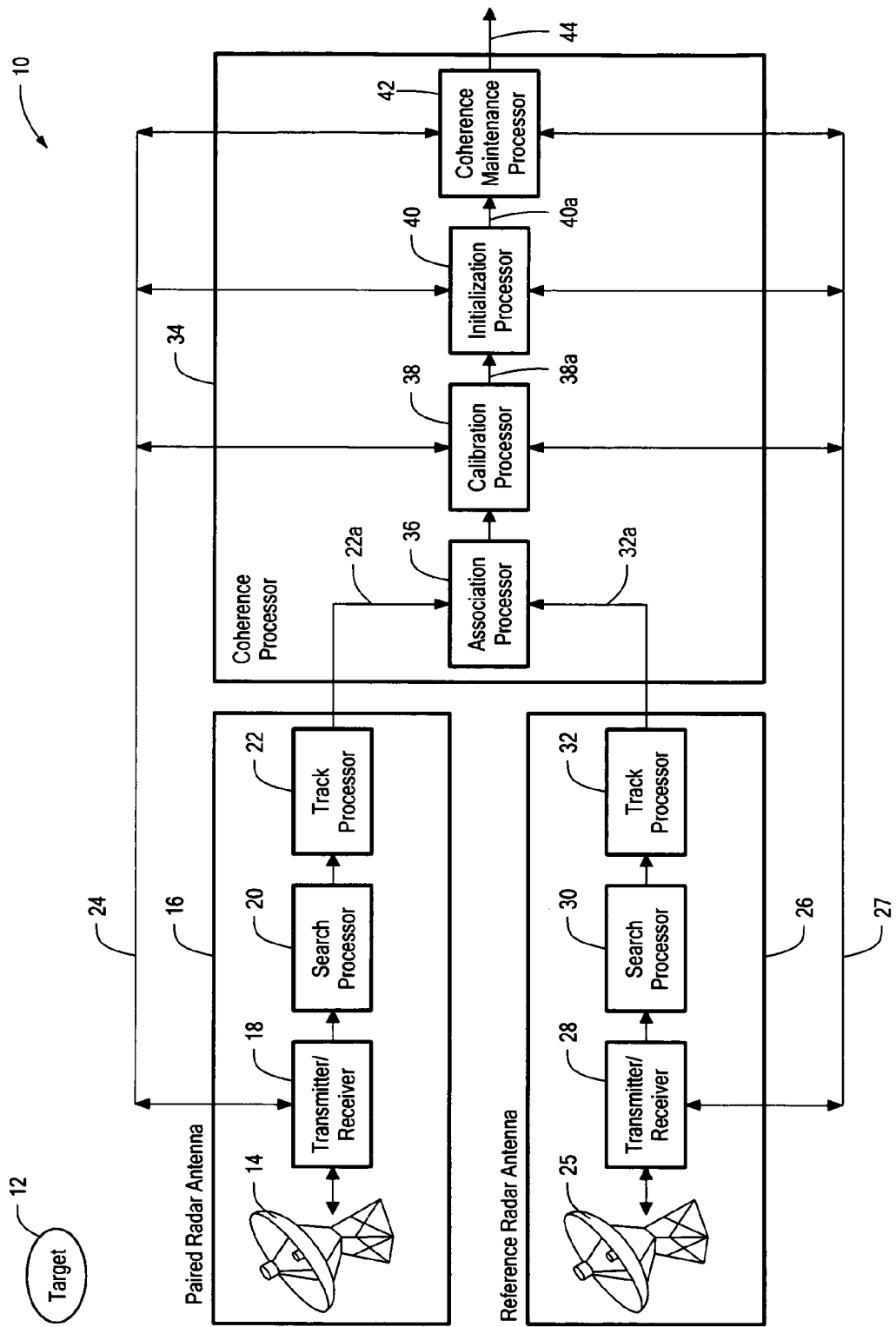
FIG. 1 is a block diagram of an exemplary radar system having a coherence processor in accordance with the present invention.

Referring to FIG. 1, a radar system 10 includes a paired radar system 16 having a paired radar antenna 14, a first transmitter/receiver 18, a first search processor 20, and a first track processor 22. The radar system 10 also includes a reference radar system 26 having a reference radar antenna 25, a second transmitter/receiver 28, a second search processor 30, and a second track processor 32. The first and second track processors 22, 32 generate respective target tracks associated with a target 12.

The radar system 10 further includes a coherence processor 34 having an association processor 36 for associating at least one respective target track provided by the first and second track processors 22, 32, respectively, a calibration processor 38 for providing phase and range calibration values 38a, and an initialization processor 40 for providing phase and range initialization values 40a. The radar system 10 further includes a coherence maintenance processor 42 to adjust at least one of a first signal transmitted by the reference radar antenna 25 and a second signal transmitted by the paired radar antenna 14 in accordance with the initialization values 40a and with the calibration values 38a, and to coherently sum a first composite signal 27 received by the reference radar antenna 25 with a second composite signal 24 received by the paired radar antenna 14.

In one embodiment, only signals transmitted by the paired radar antenna 14 are adjusted relative to signals transmitted by the reference radar antenna 25. With this particular arrangement, any number of paired radars from among a plurality of radars can be adjusted relative to a single reference radar.

In operation, the association processor 36 identifies a respective monostatic target track and a respective bistatic target track generated by each of the reference radar system 26 and the paired radar system 16 when tracking the target 12. The calibration processor 38 identifies phase and range calibration values 38a associated with the reference radar system 26 and the paired radar system 16, which can be applied at a variety of places within the coherence processor 34, for example, by the initialization processor 40. The phase and range calibration values 38a can correspond, for example, to a relative time delay (i.e., relative range) and relative phase associated with electronics within the first and second radar systems 16, 26.

The initialization processor 40 identifies phase and range initialization values 40a associated with the reference radar system 26 and the paired radar system 16, which can be applied as a starting relative phase and relative range (i.e., time delay) by the coherence maintenance processor 42 along with the calibration values 38a generated by the calibration processor 38. The coherence maintenance processor 42 generates and applies range and phase predictions to each subsequent radar pulse transmitted by the paired radar system 16, providing radar pulses that are substantially "cohered on transmit," i.e., pulses from each of the paired radar system 16 and the reference radar system 26 arrive at the target 12 generally at the same time and with the same phase. As described more fully below, the cohering on transmit result in monostatic and bistatic echoes overlapping at the reference radar and at the paired radar. Target echoes received by the coherence maintenance processor 42 from the target 12 are also "cohered on receive" in the coherence maintenance processor 42, i.e., added generally in phase after being received as further described below.

The above-described "cohering on transmit" and "cohering on receive" are described more fully in conjunction with figures below. It will become apparent in conjunction with FIGS. 2-2B that, when radar pulses are cohered on transmit, monostatic target echoes received at the paired radar antenna 14 are generally aligned in time and phase with bistatic target echoes received at the paired radar antenna 14. Also, monostatic target echoes received at the reference radar antenna 25 are generally aligned in time and phase with bistatic target echoes received at the reference radar antenna 14.

Figure 2:
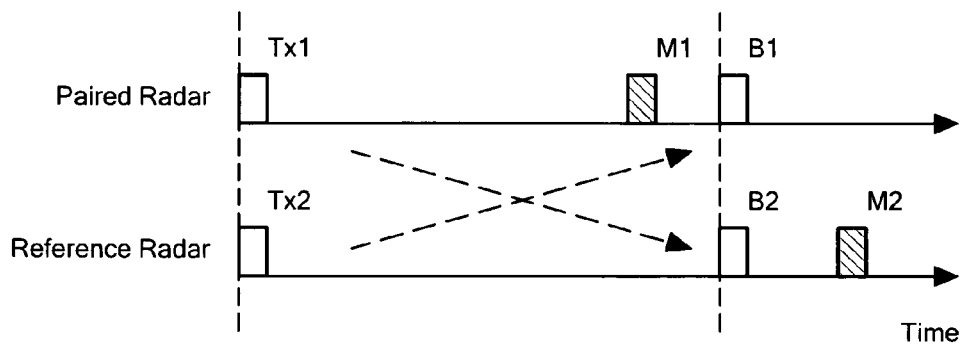
FIG. 2 is a pictorial of monostatic and bistatic target echoes received by each of two radars when both radars transmit at the same time.

Referring now to FIG. 2, a paired radar and a reference radar each generate radar pulses, identified as Tx1 and Tx2, respectively. The paired radar receives a corresponding monostatic target echo identified as M1 and a corresponding bistatic target echo identified as B1. As used herein, the term "target echo pair" refers to a monostatic target echo and a bistatic target echo, e.g., M1 and B1, received by a single radar and corresponding to a single set of transmitted pulses, e.g., Tx1, Tx2. The target echoes M1 and B1 are generally received at different times.

Similarly, the reference radar receives a corresponding monostatic target echo identified as M2 and a corresponding bistatic target echo identified as B2. The target echoes M2 and B2 are also generally received at different times. However, it will be understood that the two bistatic target echoes, B1 and B2, are received at the same time. However, receive electronics associated with each radar could cause the apparent bistatic target echoes in each radar to misalign in time and/or in phase. Calibration phase values and calibration range values described above, and more fully below, can be used to account for the misalignment of the bistatic target echoes.

The bistatic target echoes, B1, B2, are received at the same time because the round trip distance from the paired radar antenna to the target and back to the reference radar antenna is the same as from the reference radar antenna to the target and back to the paired radar antenna. However, the distance from each of the radars to the target can be different, resulting in monostatic target echoes, M1 and M2, arriving at different times as shown.

It will be apparent that a time delay between the received monostatic target echo, M1, and the received bistatic target echo B1 is the same as a time delay between the received bistatic target echo B1 and the received monostatic target echo M2.

Figure 2A:
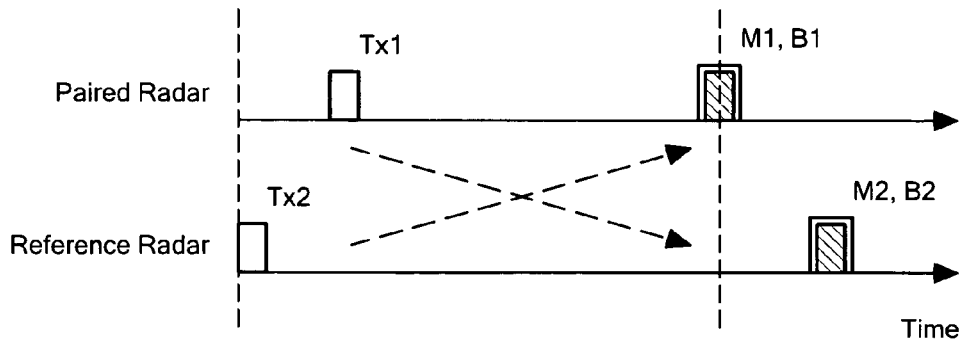
FIG. 2A is a pictorial of monostatic and bistatic target echoes received by each of two radars when the transmission from one radar is delayed relative to the other so that the monostatic and bistatic returns overlap in time at both radars.

Referring now to FIG. 2A, in which like elements of FIG. 2 are shown having like reference designations, the paired radar transmitted pulse Tx1 is delayed in time (i.e., transmitted at a delayed time) relative to the reference radar transmitted pulse Tx2. It will be appreciated that the time delay applied to the paired radar has the effect of delaying the monostatic target echo, M1, received by the paired radar and the bistatic target echo, B2, received by the reference radar, each of which is a target echo resulting from the transmitted pulse Tx1. With a particular desired time delay applied to the paired radar transmitted pulse, Tx1, the monostatic and bistatic returns can be made to overlap in the paired radar and in the reference radar as shown, providing a first composite return (M1, B1) and a second composite return (M2, B2). It will be understood that, if the paired radar transmitted pulse Tx1 and the reference radar transmitted pulse Tx2 are both at the same frequency, then, once overlapping in time, it is no longer be possible to distinguish the first monostatic return, M1, from the first bistatic return, B1, or the second monostatic return, M2, from the second bistatic return, B2.

By applying that above-described desired time delay to the paired radar transmitted pulse, Tx1, if the paired radar transmitted pulse, Tx1, and the reference radar transmitted pulse, Tx2, are both at the same frequency, then the monostatic return, M1, can be made to sum essentially coherently with the bistatic return, B1, providing improved SNR in the paired radar. Similarly, the monostatic return, M2, can be made to sum essentially coherently with the bistatic return, B2, providing improved SNR in the reference radar. It would be further desirable to coherently sum the composite return (M1, B1) with the composite return (M2, B2) to provide further processing gain.

Figure 2B:
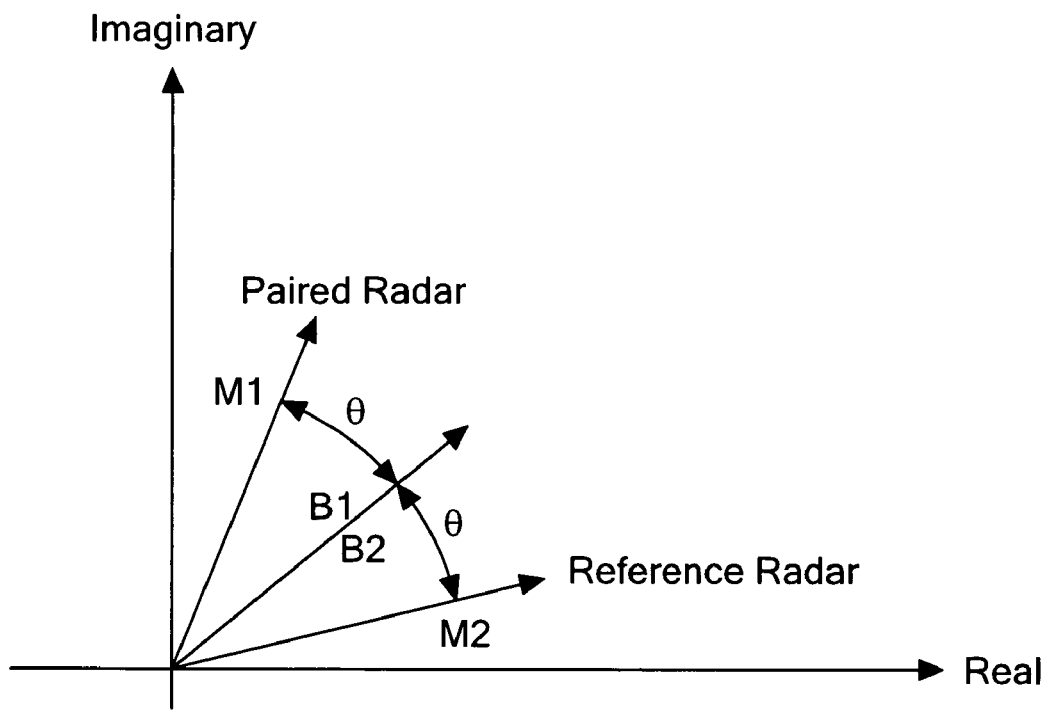
FIG. 2B is a vector diagram showing relative phases of monostatic and bistatic target echoes received by two radars in accordance with FIG. 2 when the monostatic and bistatic returns do not overlap in time at both radars.

Referring now to FIG. 2B, in which like elements of FIGS. 2 and 2A are shown having like reference designations, a vector diagram shows a vector representation of the target echoes, M1, B1, M2, B2, in accordance with FIG. 2, i.e., without a desired time delay applied as described above in conjunction with FIG. 2A. The first monostatic target echo, M1, and the first bistatic target echo, B1, are received with a phase difference, θ. The second monostatic target echo, M2, and the second bistatic target echo, B2, are received with a phase difference having the same magnitude, θ, but with opposite sign. As described above in conjunction with FIG. 2, the first monostatic target echo, M1, does not overlap in time with the first bistatic target echo, B1, and the second monostatic target echo, M2, does not overlap in time with the second bistatic target echo, B2. In this case, the signals do not sum as they would in accordance with FIG. 2A.

It can be seen that the phase difference between the first and second bistatic target echoes, B1, B2, is generally zero (not accounting for phase differences internal to the two radars) since, as described above, the bistatic path length to and from the target are identical for the two radars.

Vectors shown in FIG. 2B assume that the pulses from both radars are transmitted at the same time and with the same phase (i.e., no intentional phase offset is applied between the two radars) and that any unintentional phase differences between internal electronics of the two radars have been removed (e.g., by a factory calibration or by a field calibration such as that described above in conjunction with block 38 of FIG. 1).

As described above, the magnitude of the phase difference between the first monostatic target echo, M1, and the first bistatic target echo, B1, is the same as the magnitude of the phase difference between the second monostatic target echo, M2, and the second bistatic target echo, B2. This is important characteristic, as will become apparent from discussion below.

Figure 2C:
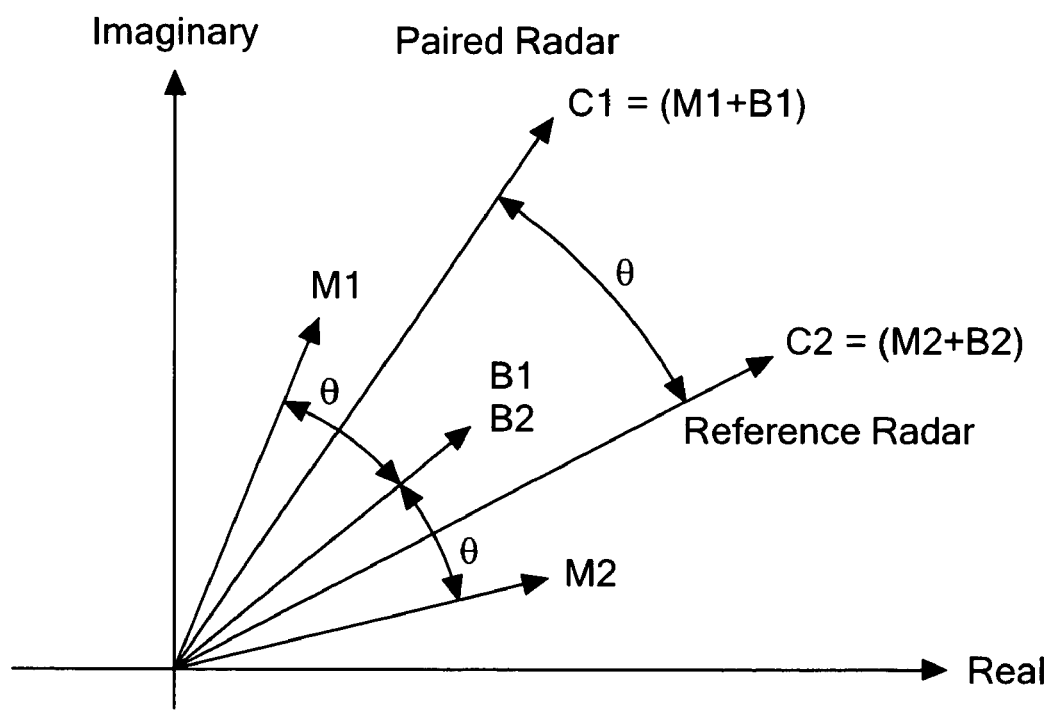
FIG. 2C is a vector diagram showing relative phases of monostatic and bistatic target echoes received by two radars in accordance with FIG. 2A, wherein the start time of the pulse from one radar adjusted to make the monostatic and bistatic returns overlap in time.

Referring now to FIG. 2C, in which like elements of FIGS. 2-2B are shown having like reference designations, a vector diagram shows a vector representation of the target echoes, M1, B1, M2, B2, in accordance with FIG. 2A, i.e., with a desired time delay applied as described above in conjunction with FIG. 2A. As described above in conjunction with FIG. 2A, the target echoes overlap in time and sum within the radars to form composite echoes. The composite target echoes observed at the paired radar and the reference radar can be represented as composite vectors C1 and C2 respectively. The composite vectors C1 and C2 differ in phase by the phase angle, θ, which matches phase differences between the vector pairs, M1, B1 and M2, B2.

It will be recognized that, once the monostatic and bistatic returns are aligned to overlap in time as shown in FIGS. 2A and 2C, which is required in order to achieve coherent gain, the phase difference between the monostatic and bistatic echoes can no longer be measured directly. However, the phase difference can be measured indirectly by measuring the phase difference between the composite vectors, C1, C2. This measured phase difference can be monitored from pulse to pulse and used to predict the phase that should be used as an offset for the next transmitted pulse from the paired radar so as to result in a zero phase angle between the monostatic and bistatic returns. The zero phase angle results in full coherent gain. The resulting zero phase angle is represented below in FIG. 2D.

Figure 2D:
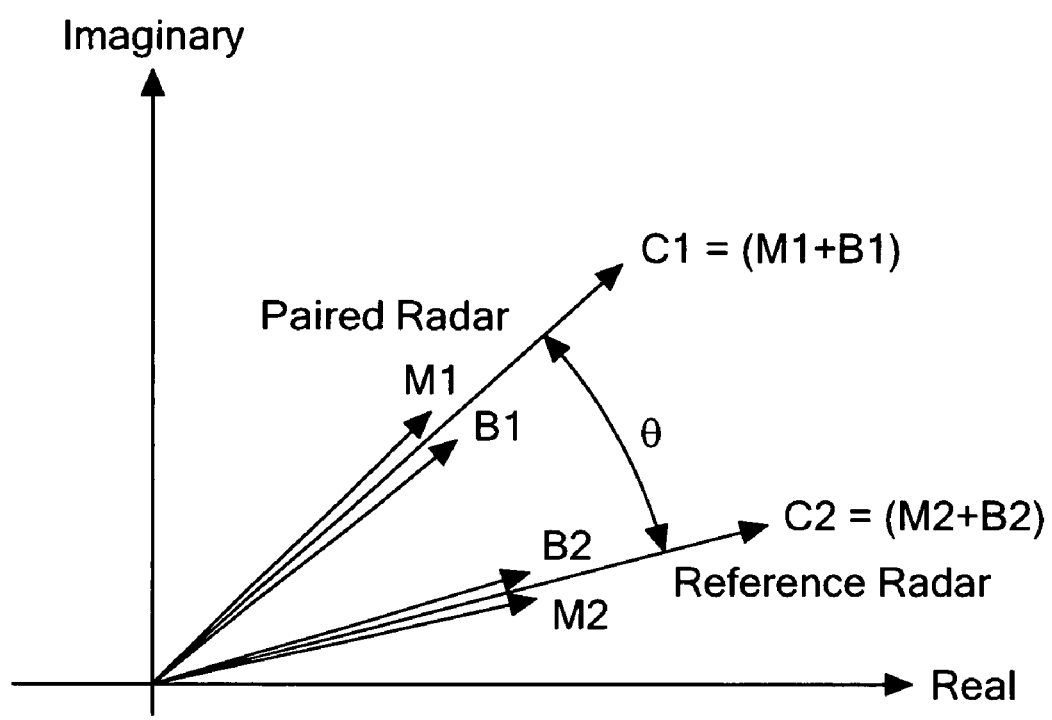
FIG. 2D is a vector diagram showing relative phases of monostatic and bistatic target echoes received by two radars also in accordance with FIG. 2A, wherein both the start time and the phase one of the radars is adjusted to make the monostatic and bistatic returns overlap in time and align in phase.

Referring now to FIG. 2D, vectors illustrate a process of providing a phase offset in a transmitted pulse from the paired radar, resulting in a zero phase angle between monostatic and bistatic received signals, M1, B1, and M2, B2, at each of the paired radar and the reference radar. In particular, a phase shift (in addition to the above described desired time delay) is applied to the pulse Tx1 (FIG. 2A) transmitted by the paired radar, wherein the phase of the first monostatic target echo, M1, and the phase of the second bistatic target echo, B2, rotate in the same direction, here shown clockwise, and by the same amount, compared with the same vectors shown in FIG. 2C.

The phase shift applied to the pulse Tx1 can be selected to achieve a phase alignment and a coherent addition of the monostatic and bistatic target echoes as shown, to achieve a coherent addition in the composite vectors, C1 and C2. Doing so achieves the above-mentioned "cohere on transmit," which aligns the monostatic and bistatic components to produce composite vectors having maximum magnitude.

It is important to note that the phase angle, θ, between the two composite vectors, C1, C2, is unaffected by any phase adjustment applied to the Tx1 pulse transmitted by the paired radar. In other words, adjusting the phase of the Tx1 pulse changes the phase between the monostatic and bistatic returns, M1, B1 and M2, B2, at both radars but in such a way that the phase between the composite vectors, C1, C2, is not affected. Thus the measured phase between the composite vectors, C1, C2, remains predictive of the phase between the radars, even if a phase adjustment made to a Tx1 pulse is in error.

As further described below, a phase or range prediction error can be measured by comparing the predicted phase difference between radars to that actually measured, providing a phase rate between pulses, which can be used to update a phase rate filter. In other words, phase or range prediction errors do not accumulate during a target track because they are corrected on every pulse.

It should be understood that the angle, θ, corresponds to a total unambiguous phase change between the monostatic and bistatic paths that has taken place since an initialization process provided, for example, by the initialization processor 40 of FIG. 1. As the target (e.g., 12, FIG. 1) moves, the observation geometry changes and the angle, θ, changes according to the geopmetry. At a particular time, the measured phase, θ, between the composite vectors, C1 and C2, can be used to predict a phase adjustment to be applied to a next transmitted pulse, Tx1, in order to successfully cohere on transmit. Also, since the angle, θ, is the absolute unambiguous change in phase since initialization, it can be converted directly (one wavelength per three hundred sixty degrees) to an absolute change in range delay since initialization and used to update the range offset for the next predicted pulse, Tx1.

The above described technique provides the above-described cohering on transmit, resulting in the two composite vectors, C1, C2, being substantially a coherent addition of associated monostatic and bistatic returns. Thereafter, the two composite vectors, C1, C2, from the two radars can be coherently combined (e.g., summed) by measuring and applying an additional phase rotation, θ, between the two composite vectors, C1, C2, in order to achieve the above-described "cohering on receive."

Cohering on transmit must be done in real time using a predicted adjustment to the transmit phase of the paired radar, since once the pulses are received, phase between the monostatic and bistatic returns cannot be changed by further processing. In contrast, cohering on receive can be performed after the pulses are received, since the composite vectors, C1, C2, are separately available in separate radars. Since the composite signals, C1, C2, are separately available, the phase angle, θ, between the composite signals, C1, C2, can be measured. The measurement can be used to improve the prediction for the phase offset to be used for the next paired radar transmit pulse (if the last prediction was perfect, the measured phase angle between the resulting composite vectors would be exactly the same as predicted). The measured phase angle, θ, between composite signals, C1, C2, also directly gives the phase rotation to use when combining these vectors so that they will sum with zero phase to provide the cohering on receive.

The vector diagrams of FIGS. 2B-2D will be further understood from the discussion of FIGS. 8-8C below, which are also vector diagrams but which show further details.

Figure 3:
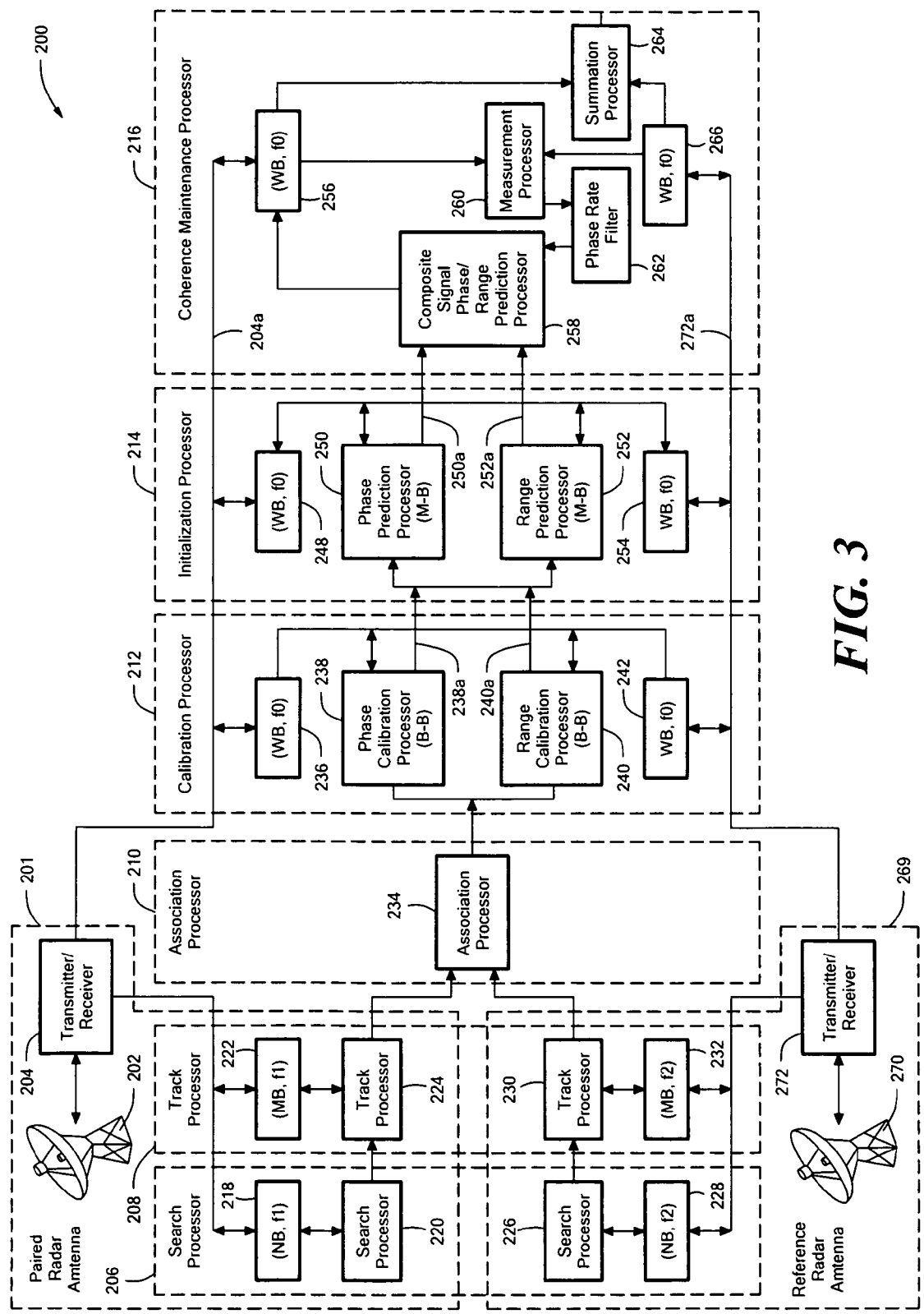
FIG. 3 is a block diagram of a radar system showing elements of FIG. 1 in greater detail.

Referring now to FIG. 3, a radar system 200 includes a paired radar system 201 having a paired radar antenna 202, a first transmitter/receiver 204, a first search processor 220, and a first track processor 224. The radar system 200 also includes a reference radar system 269 having a reference radar antenna 270, a second transmitter/receiver 272, a second search processor 226, and a second track processor 230. The first and second track processors 224, 230 generate target tracks associated with a target (not shown).

The radar system 200 further includes an association processor 210 for associating the target tracks provided by the first and second track processors 224, 230, respectively, a calibration processor 212 for providing phase and range calibration values 238a, 240a, respectively, and an initialization processor 214 for providing phase and range initialization values 250a, 252a, respectively. The radar system 200 further includes a coherence maintenance processor 216 adapted to adjust the signal transmitted by the paired radar antenna 202 in accordance with the initialization values, 250*a*, 252*a*, in accordance with the calibration values 238*a*, 240*a*, and in accordance with further adjustments described more fully below, providing the above described "cohering on transmit." The coherence maintenance processor is further adapted to coherently sum a first composite signal 272*a* received by the reference radar antenna 270 with a second composite signal 204*a* received by the paired radar antenna 202, providing a final signal 268 in accordance with the above-described "cohering on receive."

The calibration processor 212 includes a phase calibration processor 238 and a range calibration processor 240. In operation, the phase calibration processor 238 is adapted to identify a phase calibration value 238*a* corresponding to an internal phase difference between the paired radar system 201 and the reference radar system 269. The range calibration processor 240 is adapted to identify a range calibration value 240*a* corresponding to an internal range difference between the paired radar system 201 and the reference radar system 269. The phase calibration value 238*a* and the range calibration value 240*a* are discussed more fully below in conjunction with FIGS. 5 and 5A. However, let it suffice here to say that the phase calibration value 238*a* and the range calibration value 240*a* correspond to measured range and phase differences between the paired radar system 201 and the reference radar system 269 when the radar systems 201, 269 track the same target. As described more fully below, the first and second bistatic returns, B1, B2, (FIG. 2) can be used to generate the phase and range calibration values. Using the first and second bistatic returns, B1, B2, it will be understood that the phase and range calibration values 238*a*, 240*a* are relatively unaffected by movement of a tracked target. This is true because, during calibration, the two radars measure the bistatic path at substantially the same instant of time.

The initialization processor 214 includes a phase prediction processor 250 and a range prediction processor 252. In operation, the phase prediction processor is adapted to provide a phase initialization value 250*a* corresponding to a next-pulse predicted phase difference between the paired radar system 201 and the reference radar system 269. The range prediction processor 252 is adapted to provide a range initialization value 252*a* corresponding to a next-pulse range difference between the paired radar system 201 and the reference radar system 269. The phase initialization value 250*a* and the range initialization value 252*a* are discussed more fully below in conjunction with FIGS. 7 and 7A. However, let it suffice here to say that the phase initialization value 250*a* and the range initialization value 252*a* correspond to predicted range and phase differences between the paired radar system 201 and the reference radar system when the systems track the same target.

It should be understood that the target can be a moving target, and the phase initialization value 250*a* and the range initialization value 252*a* correspond to a predicted range and phase at a new target location, having moved from the last target location. As described more fully below, the monostatic and bistatic returns, M1, B1, M2, B2, (FIG. 2) can be used to generate the phase and range initialization values.

The coherence maintenance processor 216 includes a measurement processor 260, a phase rate filter 262, a composite signal phase/range prediction processor 258, and a summation processor 264. In operation, the composite signal phase/range prediction processor 258 receives the phase calibration phase initialization values 250*a* and the range initialization values 252*a* (and, in some embodiments, the phase calibration values 238*a* and the range calibration values 240*a*) in order to generate first transmitted pulses from the reference radar antenna 270 and from the paired radar antenna 202 that are cohered on transmit (see, for example, FIG. 2A). The composite signal phase/range prediction processor 258 is adapted to generate new phase/range predictions used to generate subsequent transmitted pulses. The measurement processor 260 receives composite signals (see, for example, C1, C2, FIG. 2B), and measures relative phases between the composite signals to update the phase rate filter 262. The phase rate filter 262, in conjunction with the composite signal phase/range prediction processor 258, generates the above-described new phase/range prediction used to generate subsequent transmitted pulses. The summation processor 264 adds the composite signals generally in phase (i.e., coheres on receive).

The phase rate filter 262 estimates the rate at which the phase, θ, (see, e.g., FIG. 2D) between the composite signals, and therefore, between the monostatic and bistatic echoes, changes as the target moves. This rate is used to predict a phase correction to be applied to the next transmit pulse from the paired radar system 201, such that the monostatic and bistatic returns at both radars will add in phase upon reception (i.e., so that the returns will be cohered on transmit). In one particular embodiment, the phase rate filter is a single parameter fading memory filter (also sometimes referred to and an alpha filter). An equation for this type of filter can be written as follows:

$$d\theta/dt(n+1) = \alpha[d\theta/dt(n)] + (1-\alpha)(\Delta\theta/\Delta t), \text{ where}$$

n=transmitted pulse number dθ/dt(n+1)=phase rate to be used for computing phase of next transmitted pulse, α=a constant between 0 and 1, dθ/dt(n)=phase rate that was used to compute phase of last transmitted pulse, Δθ=θ(n)−θ(n−1)=change in phase angle between composite returns, θ, between last two pulses, and Δt=time between last two transmitted pulses.

It will be recognized that the constant, α, determines how much the predicted phase rate will be influenced by the most recent measurement (most responsive to recent changes but also most vulnerable to contamination by noise) and how much the predicted phase rate will be influenced by the smoothed estimate made over all previous measurements (least affected by measurement noise but also least responsive to recent changes).

It should be understood that improved performance can be obtained by using filters having greater complexity for some target types, target velocities, measurement geometries, pulse repetition rates, and SNRs. For example, a filter that computes and uses higher time derivatives of phase can be used in place of the above-described alpha filter if the SNR and the magnitude of these derivatives are sufficiently high. For another example, a Kalman filter incorporating equations of motion for targets moving under the influence of gravity can be used in place of the above-described alpha filter, in particular if the targets of interest are satellites or ballistic missiles.

The output of the phase rate filter 262 is used by the composite signal phase/range prediction processor 258 to predict the phase and range offset between radars to be used for the next transmitted pulse generated by the paired radar system 201. The predicted phase offset can be written as follows:

$$\theta(n+1) = \theta(n) + [d\theta/dt(n+1)]\Delta t$$

The predicted range offset can be written as follows $\Delta R(n+1) = [\theta(n+1)/360]\lambda$, where:

$\lambda$ is the radar wavelength, and $\theta$ is measured angle between composite returns in degrees.

It is important to note that the angle, $\theta$, is the cumulative absolute phase difference between radars since the coherent initialization process began.

It will be understood that modern radars allow waveform center frequency and waveform bandwidth to be changed from pulse to pulse to best fit an application or function. In the radar system 200, the functions include, for example, a search function associated with the search processor 206, a track function associated with the track processor 208, a calibration function associated with the calibration processor 212, an initialization function associated with the initialization processor 214, a coherence maintenance function associated with the coherence maintenance processor 216, and a target identification function for which an associated processor is not shown.

It will be understood that, in general, a wider waveform bandwidth results in a better range resolution. In some embodiments, the range extent of a narrowband (NB) pulse is large compared to a target extent (in range), the range extent of a medium band (MB) pulse is approximately matched to the target extent, and the range extent of a wideband (WB) pulse is small compared to the target extent. Blocks 218 and 228 indicate that narrowband (NB) pulses can be used for the search function (i.e., to minimize a number of range cells needed to cover a search volume, thus minimizing signal processing load and false alarm rate). Blocks 218 and 228 also indicate that the paired and the reference radar systems 201, 269, respectively, can be operated on different center frequencies, f1 and f2 for the search function (i.e., so that search pulses from co-located radars can be sent at the same time without causing mutual interference). Blocks 222 and 232 indicate that medium band (MB) pulses can be used for the track function (i.e., to provide improved track measurement accuracy in the range dimension) and that tracking can be done using the same center frequencies, f1, f2, as those used for the search function (simplifying handover from search to track). Blocks 212 and 242 indicate that the paired and the reference radar systems 201, 269, respectively, can be calibrated (i.e., to eliminate any equipment differences in phase or time delay) using wideband pulses (WB) having the same center frequency, f0. Wideband pulses, having a sufficiently short duration, can be used for the calibration function so that the bistatic returns at both that the paired and the reference radar systems 201, 269, respectively, can be separated in time from the monostatic returns, and therefore, examined without contamination from the monostatic returns (see, e.g., FIG. 2). Blocks 248 and 264 indicate that the initialization function can also use wideband pulses (WB) having the same center frequency, f0, from each of the two radar systems 201, 269. Blocks 256 and 266 indicate that the coherence maintenance function can also use wideband (WB) pulses having the same center frequency, f0, from each of the two radar systems 201, 269.

As described above, the exemplary radar system 200 can use only wideband (WB) pulses for target identification (not shown), which are ultimately combined. The above-described search and track functions require only that a largest scatterer on a target be detectable. However, additional SNR is required for target identification since both large and small scatterers need to be detectable. It should be understood, however, that the system and methods described herein are also applicable to any of the above-described radar waveforms and functions (e.g. the MB waveforms used for track).

In the radar system 200, it will be appreciated that, after the calibration function is performed by the calibration processor 212, and after the initialization function is performed by the initialization processor 214, the same form of wideband pulses having the same center frequencies can be used for the coherence maintenance function performed by the coherence maintenance processor 216 during the remainder of the target track that would have been used to perform the target identification function without the coherent addition techniques and apparatus provided by the present invention. In other words, no additional radar resources need be used to maintain coherent signal addition during the track.

Figure 4:
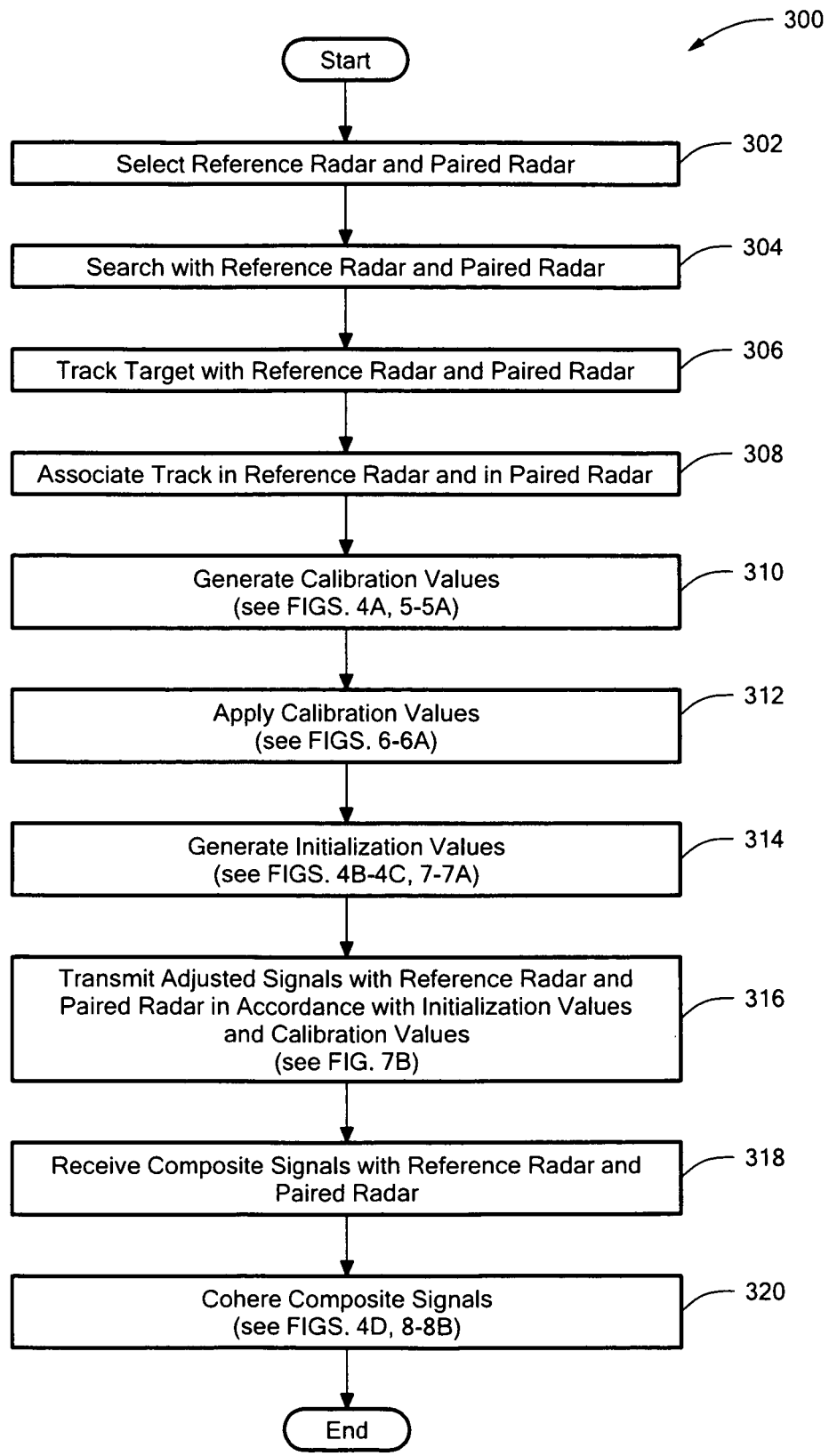
FIG. 4 is a flow chart showing a method of cohering two radars.
Figure 4A:
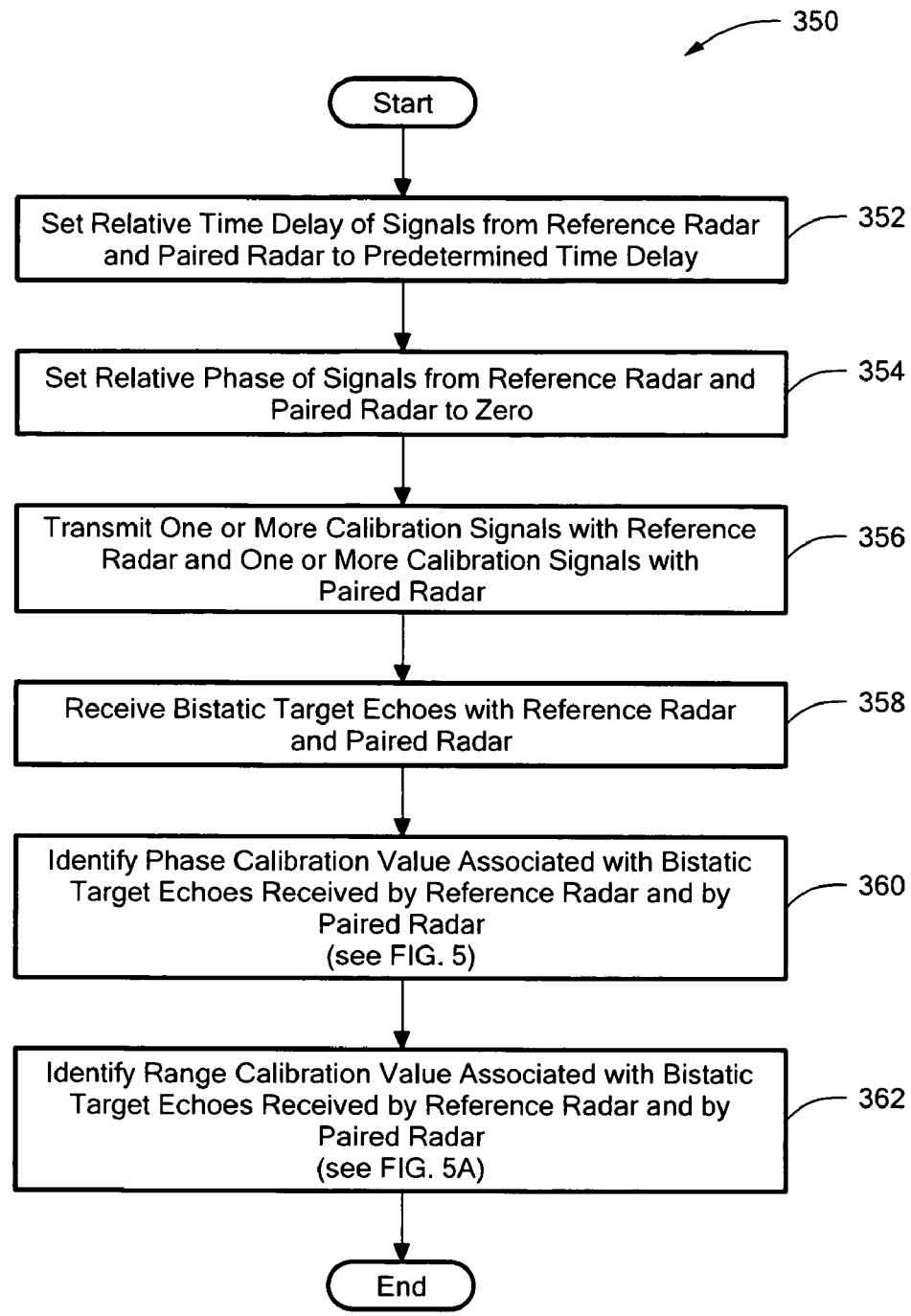
FIG. 4A is a flow chart showing in greater detail a portion of the method of FIG. 4, including calibration of two radars.
Figure 4B:
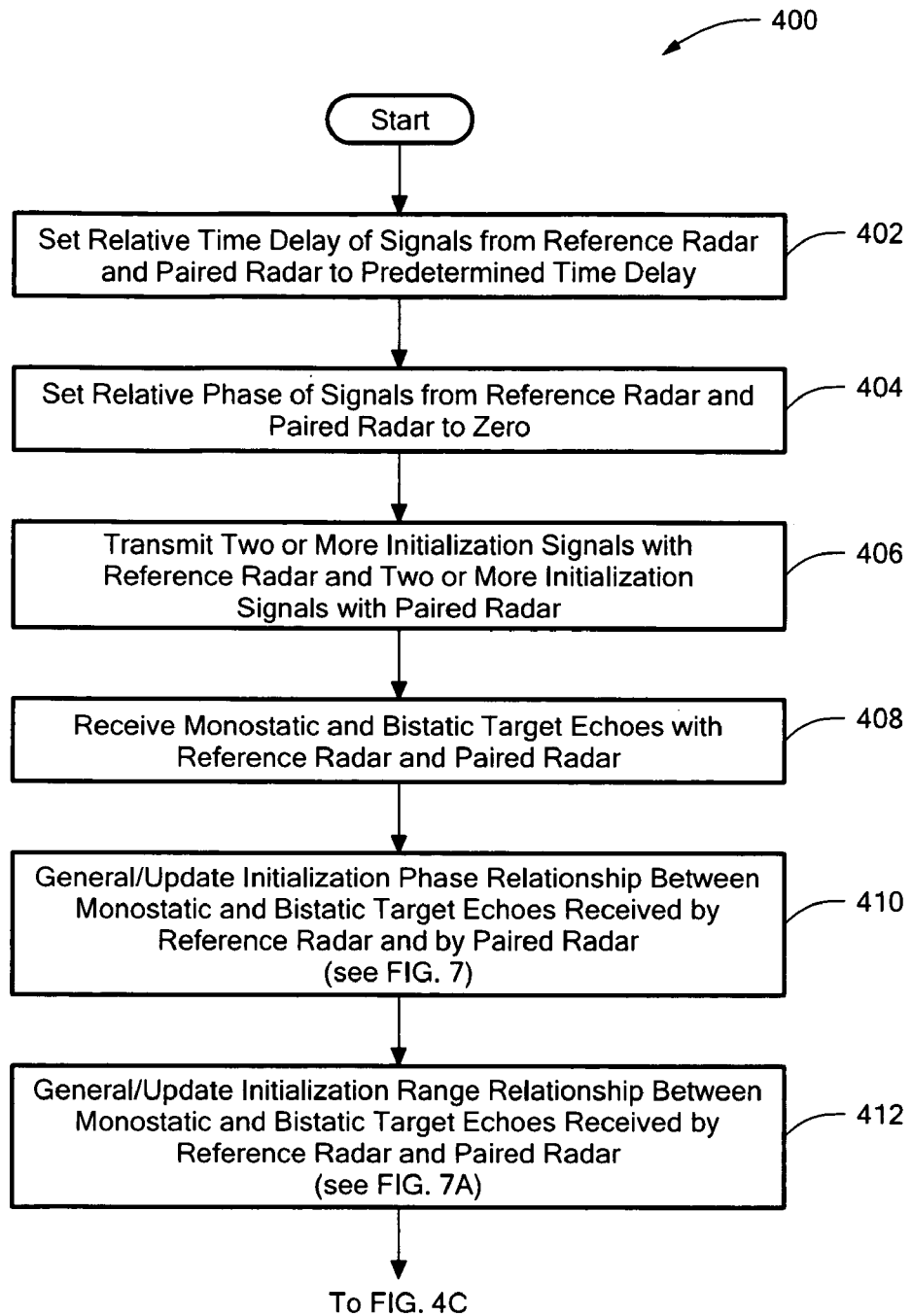
FIGS. 4B and 4C are flow charts showing in greater detail another portion of the method of FIG. 4, including initialization of two radars.
Figure 4C:
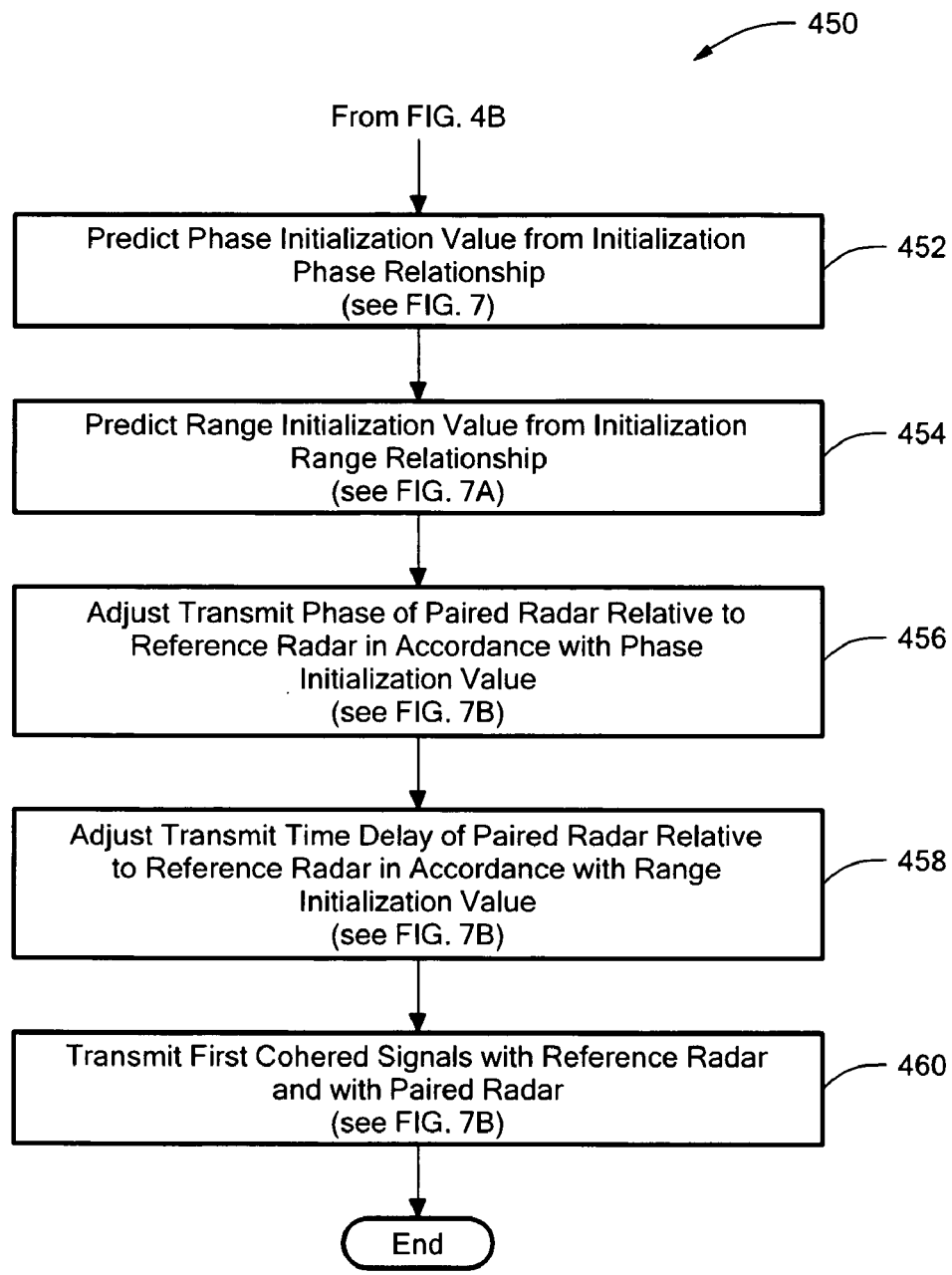
Figure 4D:
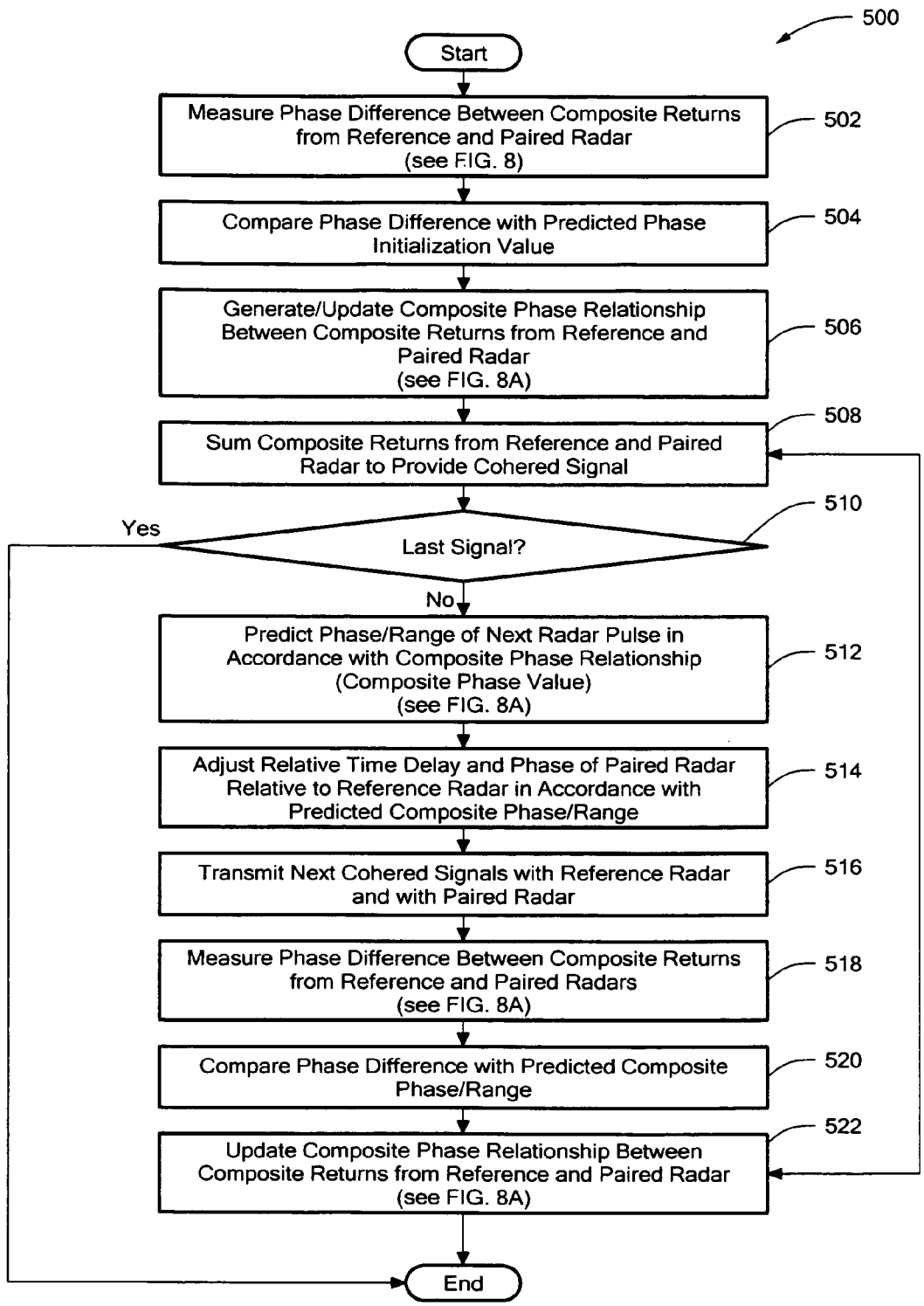
FIG. 4D is a flow chart showing in greater detail yet another portion of the method of FIG. 4, including maintaining coherence of two radars.

It should be appreciated that FIGS. 4-4D show flowcharts corresponding to the below contemplated technique which would be implemented in a computerized radar system, for example the radar system 10 (FIG. 1). The rectangular elements (typified by element 302 in FIG. 4), herein denoted "processing blocks," represent computer software instructions or groups of instructions. The diamond shaped elements (typified by element 510 in FIG. 4D), herein denoted "decision blocks," represent computer software instructions, or groups of instructions which affect the execution of the computer software instructions represented by the processing blocks. It should be appreciated that although multiple processors are taught in this specification, depending upon cost and processing requirements, one or more of the processors may be combined into a single processor with computer instructions required to operate this processor included accordingly.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

The processes identified in FIGS. 4-4D are also described pictorially in conjunction with FIGS. 5-8C below.

Referring now to FIG. 4, a process 300 for cohering radars begins at block 302, where a reference radar and a paired radar are selected from among a plurality of radars. It will be appreciated that while the processes described herein describe but one paired radar, any number of paired radars can be processed in conjunction with the reference radar using the same techniques.

At block 304, the paired radar and the reference radar perform a search to identify one or more targets, and at block 306, the paired radar and the reference radar generate one or more target tracks associated with the one or more targets. For example, the search can be performed with the search processors 20, 30 of FIG. 1, and the tracking can be performed with the track processors 22, 32 of FIG. 1. A target track is known to include points in time, each having, for example, a range to a target, an elevation angle to the target, and an azimuth angle to the target. The target can move with time.

At block 308, the target tracks from the paired radar and from the reference radar are associated. With this arrangement, the association allows tracks corresponding to the same target to be grouped together. The target tracks can include both monostatic and bistatic target tracks from the paired radar and from the reference radar. In this way, for example, target echoes, M1, B1, M2, B2, (FIG. 2) can be identified as returns from the same target. The association can be performed, for example, by the association processor 36 of FIG. 1 or the association processor 210 of FIG. 3.

At block 310, calibration values, including a phase calibration value and a range calibration value are measured. The calibration values can be measured, for example, by the calibration processor 38 of FIG. 1 or the calibration processor 212 of FIG. 3 and can correspond, for example, to the calibration values 238a, 240a of FIG. 3. The process of block 310 is further described in conjunction with FIG. 4A.

At block 312, the calibration values are applied to one or both of the reference radar and the paired radar.

At block 314, initialization values, including a phase initialization value and a range initialization value are generated. The initialization values can be generated, for example, by the initialization processor 40 of FIG. 1 or the initialization processor 214 of FIG. 3 and can correspond, for example to the initialization values 250a, 252a of FIG. 3. The process of block 314 is further described in conjunction with FIGS. 4B and 4C.

At block 316, adjusted signals are transmitted by the paired radar and by the reference radar in accordance with the calibration values and with the initialization values. In one particular embodiment, the adjusted signals are transmitted by the paired radar, and the reference radar transmits unadjusted signals. The adjusted signals are adjusted in time delay and in phase to achieve composite signals, i.e., the composite vectors, C1 and C2, of FIG. 2D.

At block 318, the composite signals are received by the paired radar and by the reference radar. The composite signals can correspond, for example, to the composite vectors, C1 and C2, of FIG. 2D. The signals received at block 318 correspond to but a first pair of signals used by the coherence maintenance processor 42 of FIG. 1 or 216 of FIG. 3

At block 320, the composite signals received at block 318 are cohered on receive, i.e., phase shifted and added in phase. The addition can be performed, for example, by the summation processor 264 of FIG. 3. Subsequent received composite signals are also cohered on receive. The process of block 320 is further described below in conjunction with FIG. 4D.

Referring now to FIG. 4A, a process 350 for generating the above-described calibration values begins at block 352, where a predetermined relative time delay is set corresponding to a time delay between signals transmitted by the paired radar relative to the reference radar. At block 354, a relative phase difference between the paired radar transmitted pulses and the reference radar transmitted pulses is set to zero.

In one particular embodiment, at block 352, the predetermined relative time delay is at least as large as a time delay required for radar energy to travel from the paired radar to the reference radar. With this arrangement, when radar pulses are transmitted by the paired radar and the reference radar at a target, it is not possible for the monostatic and bistatic returns to overlap in time in either radar as was shown, for example, in FIG. 2A. It is desirable during calibration to be able to identify and compare the bistatic returns in each radar, separate and apart from the monostatic returns.

As described above, the bistatic returns have exactly the same path length at any instant in time. Therefore, if transmitted pulses from the paired radar and the reference radar were transmitted at exactly the same time (and they are generally not) the bistatic returns should be received in each radar with exactly the same time delay, i.e., at the same time. Because the predetermined time delay of block 352 is known, it can be subtracted from the relative time delay of the received bistatic returns, and any remaining time delay, therefore, corresponds to an internal time delay difference associated with the two radars. Any minor corrections for the change in bistatic path length during the time between transmitted pulses can be determined in accordance with range rate information available from the target track, as will become apparent below. Similarly, any remaining phase difference in the received bistatic target echoes corresponds to an internal phase difference associated with the two radars.

It will be appreciated that the above-described time delay difference and phase difference can be associated with a variety of factors, including, but not limited to, different electronic responses in the two radars.

It will also be appreciated that both range and phase calibrations need to be done as further described below, since phase difference alone is ambiguous every 360 degrees. For example, if only the phase difference between the radars were measured and found to be zero, there would be no way to determine if the range difference between radars were also zero or some integer number of wavelengths. Making independent measurements of the range and phase differences between radars avoids any calibration ambiguity.

At block 356, one or more pulses having the predetermined relative time delay and zero phase difference are transmitted by the paired radar and by the reference radar, resulting in receipt of bistatic target echoes in each radar at block 358.

At block 360, based upon the above-described phase difference between the bistatic returns at the two radars, a phase calibration value is identified. Similarly, at block 362, based upon the above-described time delay difference between the bistatic returns, a range calibration value is identified.

It should be apparent that, even though a predetermined time delay in block 352 is applied to pulses transmitted by the paired radar in block 356, the predetermined time delay can be subtracted from the measured time delays upon receipt of the target echoes. As described above, the predetermined relative time delay selected at block 352 and applied at block 356 does not cause the monostatic and bistatic returns to overlap as they do, for example, in FIG. 2A.

Referring now to FIG. 4B, a process 400 for generating the above-described phase initialization value and the range initialization value begins at block 402 where a predetermined time delay is selected with which to delay a paired radar transmitted pulse from a reference radar transmitted pulse. The predetermined time delay is selected in much the same way and for much the same reasons as described above in conjunction with block 352 of FIG. 4A.

At block 404, a relative phase difference between the paired radar transmitted pulses and the reference radar transmitted pulses is set to zero.

At block 406, two or more initialization signals, i.e., transmitted pulses, are transmitted by the paired radar and by the reference radar, and, at block 408, corresponding target echoes are received by the paired radar and by the reference radar. The target echoes received can be similar to those described, for example as M1, B1, M2, and B2 shown in FIG. 2. The monostatic and bistatic target echoes do not yet overlap in the way shown, for example, in FIG. 2A.

From the received target echoes, at block 410, a phase initialization relationship is generated or updated corresponding to a phase difference between a monostatic target echo and a bistatic target echo received at each radar. A phase difference between each pair of received monostatic and bistatic target echoes received by the paired radar is used to provide a new data point in the phase initialization relationship. Also, a phase difference between each pair of received monostatic and bistatic target echoes received by the reference radar can be used to provide another new data point in the phase initialization relationship.

In one particular embodiment, the phase initialization relationship is a phase rate relationship formed by generating a least squares linear fit between the phase difference data points. However, in other embodiments, mathematical relationships other than a least squares linear fit can be used. The phase initialization relationship is further described below in conjunction with FIG. 7.

The pulse rate used for the initialization process must be high enough so that the phase between the composite vectors of the two radars changes by less than +/−180 degrees between pulses in order that the rate of phase change between radars can be measured unambiguously. This will allow the phase change between the time between pulses to be measured unambiguously after the initialization process is completed even if the pulse rate is reduced (to save radar resources) and will therefore allow the measured phase rate to be converted directly into range rate (so as to maintain range alignment once the monostatic and bistatic components have been overlapped in range and can no longer be measured separately).

Similarly, at block 412, a range initialization relationship is generated or updated corresponding to a range difference between a monostatic target echo and a bistatic target echo received at each radar.

A range (time delay) difference between each pair of received monostatic and bistatic target echoes received by the paired radar is used to provide a new data point in the range initialization relationship. Also, a range (time delay) difference between each pair of received monostatic and bistatic target echoes received by the reference radar can be used to provide another new data point in the range initialization relationship.

In one particular embodiment, the range initialization relationship is a range rate relationship formed by generating a least squares linear fit between the range (time delay) data points. However, in other embodiments, mathematical relationships other than a least squares linear fit can be used. The range initialization relationship is further described below in conjunction with FIG. 7A.

It should be apparent that, even though a predetermined time delay in block 402 is applied to pulses transmitted by the paired radar in block 406, the predetermined time delay can be subtracted from the measured time delays upon receipt of the target echoes. It should also be appreciated that the predetermined time delay selected at block 402 and applied at block 406 does not cause the monostatic and bistatic returns to overlap as they do, for example, in FIG. 2A.

Referring now to FIG. 4C, a process 450 continues the process 400 of FIG. 4B. At block 452, a phase initialization value is predicted from the phase initialization relationship. The prediction corresponds to an expected phase between monostatic and bistatic target echoes received by each radar upon the next pair of pulses transmitted by the paired radar and the reference radar. It will be appreciated that the predicted phase is related, in part, to movement of the target.

In one particular embodiment, the phase initialization value is predicted by using the above-described least squares linear relationship between the phase data points (block 410 of FIG. 4B) and looking forward in time on the line to the time of a next received target echo pair. The least square fit phase initialization relationship and prediction are described pictorially below in conjunction with FIG. 7.

At block 454, a range (time delay) initialization value is predicted from the range initialization relationship. The prediction corresponds to an expected range (time delay) between monostatic and bistatic target echoes received by each radar upon the next pair of pulses transmitted by the paired radar and the reference radar. It will be appreciated that the predicted range is related, in part, to movement of the target.

In one particular embodiment, the range initialization value is predicted by using the above-described least squares linear relationship between the range data points (block 412 of FIG. 4B) and looking forward in time on the line to the time of a next received target echo pair. The least square fit range (time delay) initialization relationship and prediction are described pictorially below in FIG. 7A.

At block 456, the predicted phase initialization value is used to adjust a phase of a next transmitted pulse by the paired radar, and, at block 458, the predicted range (time delay) initialization value is used to adjust a range (time delay) of the next transmitted pulse by the paired radar. Furthermore, the predetermined time delay applied at block 402 of FIG. 4B is removed.

At block 460, the first cohered signals, i.e., transmitted pulses, are transmitted by the paired radar and by the reference radar. These cohered signals are cohered only on transmit. Whereas target echoes received at earlier blocks provide echoes typified by target echoes shown in FIG. 2, the transmitted cohered signals of block 460 provide target echoes typified by the target echoes of FIG. 2A, for which the monostatic and bistatic target echoes overlap in time at each radar to provide composite signals typified by composite vectors, C1 and C2, of FIG. 2C.

Referring now to FIG. 4D, a process 500 maintains the transmit coherency (cohere on transmit) provided first at block 460 of FIG. 4C, but now for subsequent transmitted pulses. The process 600 also provides coherency on receive by adding the received composite signals in phase.

The process 500 begins at block 502 by receiving and measuring a phase difference between composite target echoes associated with the signal transmission at block 460 of FIG. 4C. The target echoes received are composite signals, as represented, for example, in FIG. 2C, for which the monostatic and bistatic returns are at the same signal frequency (see FIG. 3) and appear at the same time.

At block 504 the composite signal received by the paired radar is compared in phase with the composite signal received by the reference radar. As described above in conjunction with FIG. 2D, the phase difference between the composite signals remains constant when the phase of the paired radar is changed, yet the phase difference changes in response to movement of the target (and also in response to system noise).

If the range and phase initialization values applied to the radar signals transmitted at block 460 of FIG. 4C were a perfect predictions, then it would be expected that the phase angle between the two composite target echoes would be exactly equal to the phase prediction. However, the range and phase initialization values, and particularly the phase prediction value, applied to the radar signals transmitted at block 460 of FIG. 4C is not necessarily a perfect prediction (because of measurement noise and unanticipated target motion). Therefore a residual phase error between the composite signals corresponds to an error in the phase initialization value. The residual error is determined at block 504, for example, by the measurement processor 260 of FIG. 3.

At block 506, the residual phase error between the composite signals received at the paired radar and at the reference radar is used to generate and/or update a composite signal phase relationship. The composite signal phase relationship is described more fully below in conjunction with FIGS. 8A and 8B.

The composite signal phase relationship can be maintained, for example, by the phase rate filter 262 of FIG. 3. As described above, the phase rate filter 262 can be implemented by one or more of a variety of filters, including but not limited to, a simple single parameter smoothing filter (described above), commonly known as an "alpha" filter, a polynomial filter that estimates higher time derivatives of phase, or a Kalman filter that can include models of target motion.

At block 508, knowing the phase between the composite target echoes received in the paired radar and in the reference radar as measured at block 502, the composite target echoes received in the paired radar and in the reference radar are summed coherently, i.e., in phase, to provide a final signal, for example, the final signal 268 of FIG. 3.

If at decision block 510, the signals are not the last signals, the process proceeds to block 512, where, using the phase relationship of block 508, a prediction is made as to the phase (and range) to use in conjunction with an adjustment of the paired radar in the next pulse transmitted by the paired radar. The prediction is referred to herein as a "composite phase value." In some embodiments, the prediction is made linearly, using the phase and range measured on the last pulse and the updated phase and range rate. However, in other embodiments, the prediction is generated by the phase rate filter 262 of FIG. 3. The updated range between radars can be calculated directly from the updated phase using the fact that range changes by one wavelength for every three hundred sixty degrees of phase change.

At block 514, the predicted phase (and range) is applied to the paired radar and at block 516 a next pulse pair is transmitted by the two radars, wherein the predictions are applied to the paired radar alone.

At block 518, the phase difference between received composite target echoes is again measured. At block 520, the measured phase is compared with the prediction of block 512, and, at block 522, the composite signal phase relationship is updated.

With the technique of FIG. 4D, the pulses transmitted by the paired radar can be adjusted in phase (and time delay) in accordance with predictions made by the composite signal phase relationship of block 522 (e.g., in accordance with the phase rate filter) in order to maintain the coherence on transmit, which is shown pictorially in FIG. 2D. This results in coherent in-phase addition of the monostatic and bistatic target echoes, and therefore, improved signal gain. The cohered composite signals are summed at block 508, achieving even more processing gain.

FIGS. 5-8C show the processes described in conjunction with FIGS. 4-4D in pictorial form.

Figure 5:
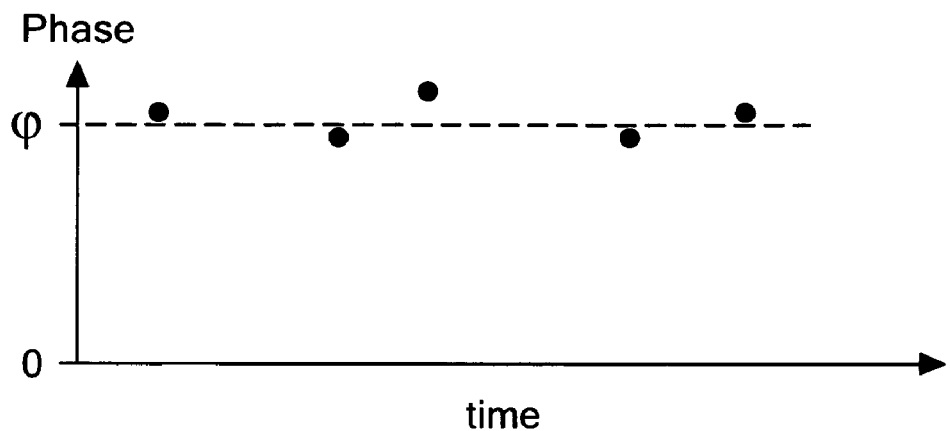
FIGS. 5 and 5A are graphs showing a pictorial representation associated with the calibration method of FIG. 4A.

Referring now to FIG. 5, a graph shows a pictorial representation of the block 310 of FIG. 4 and the calibration process 350 of FIG. 4A. The graph has a horizontal axis in units of time and a vertical axis corresponding to a phase difference between bistatic target echoes received by the paired radar 16 and by the reference radar 26 of FIG. 1. Dots correspond to successive measurements of a phase difference, $\phi$, between bistatic target echoes received at the paired radar and at the reference radar corresponding to successive transmitted radar pulses. As described in conjunction with FIG. 2A, if the two radars had no internal phase differences, it would be expected that the two bistatic returns would align in phase. However, a phase difference, $\phi$, is measured between the bistatic returns at the two radars. The phase difference, $\phi$, is the phase calibration value described above.

The phase calibration value can be determined with but one transmitted pulse by the paired radar and by the reference radar. However, use of multiple pulses and a corresponding multiple of phase measurement data points as shown can improve the resulting accuracy of the phase calibration value.

It should be appreciated that, the phase between the bistatic target echoes is expected to be essentially constant even as a target moves. Thus, the phase measurements between the bistatic target echoes in the two radars can be taken on a moving target.

Figure 5A:
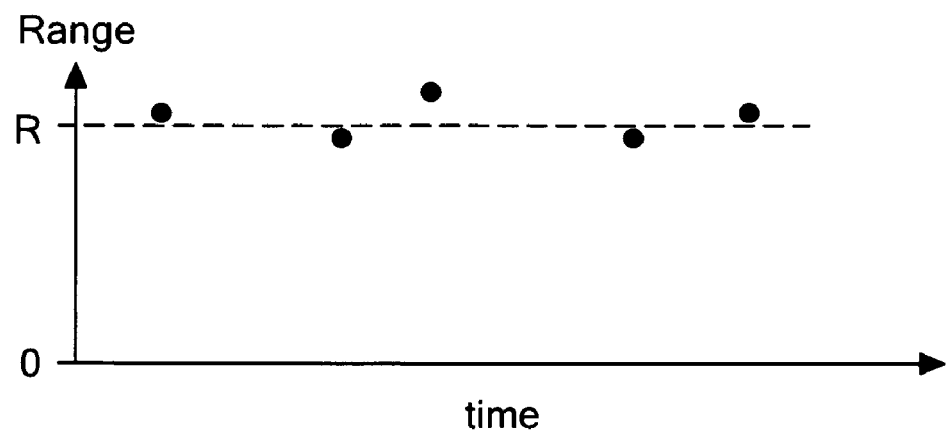

Referring now to FIG. 5A, a graph shows a pictorial representation of further aspects of the block 310 of FIG. 4 and the calibration process 350 of FIG. 4A. The graph has a horizontal axis in units of time and a vertical axis corresponding to a range (time delay) difference between the bistatic target echoes received by the paired radar 16 and by the reference radar 26 of FIG. 1. Dots correspond to successive measurements of a range difference between bistatic target echoes received at the paired radar and at the reference radar. As described in conjunction with FIG. 2A, if the two radars had no internal range (time delay) differences, it would be expected that the two bistatic returns would align in range. However, as indicated, a range difference of R is measured between the bistatic returns at the two radars. The value, R, is the range calibration value described above.

The range calibration value can be determined with but one transmitted pulse by the paired radar and by the reference radar. However, use of multiple pulses and a corresponding multiple of range measurement points as shown can improve the resulting accuracy of the range calibration value.

It should be appreciated that, the time delay (range) between the bistatic target echoes is expected to be constant even as a target moves. Thus, the range measurements between the bistatic target echoes in the two radars can be taken on a moving target.

As described above in conjunction with box 352 of FIG. 4A, it may be desirable to apply a predetermined time delay to the paired radar relative to the reverence radar. The predetermined time delay can be removed from the received bistatic signal to arrive at the measurements of FIG. 5A.

Figure 6:
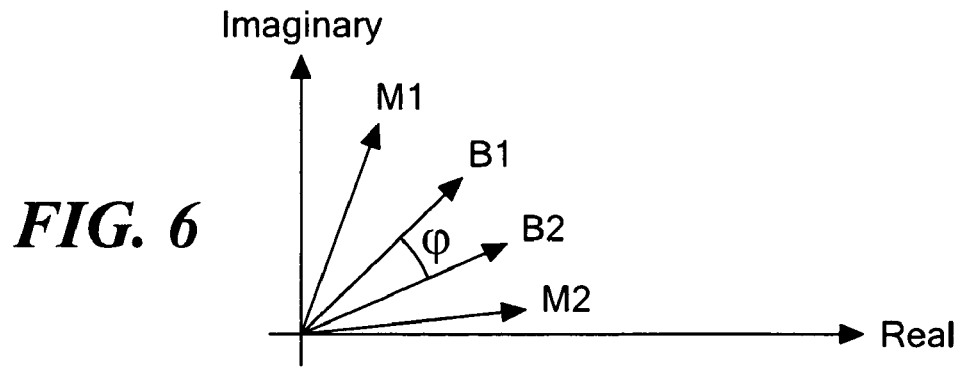
FIGS. 6-6B are vector diagrams showing another pictorial representation associated the calibration method of FIG. 4A.

Referring now to FIG. 6, a graph shows vectors associated with the block 310 of FIG. 4 and the calibration process 350 of FIG. 4A. Vectors, B1 and B2, correspond to bistatic target echoes received at the un-calibrated paired radar and at the un-calibrated reference radar having a phase difference, $\phi$, as described above in conjunction with FIG. 5. Vectors, M1 and M2, correspond to monostatic target echoes received at the paired radar and at the reference radar respectively.

Figure 6A:
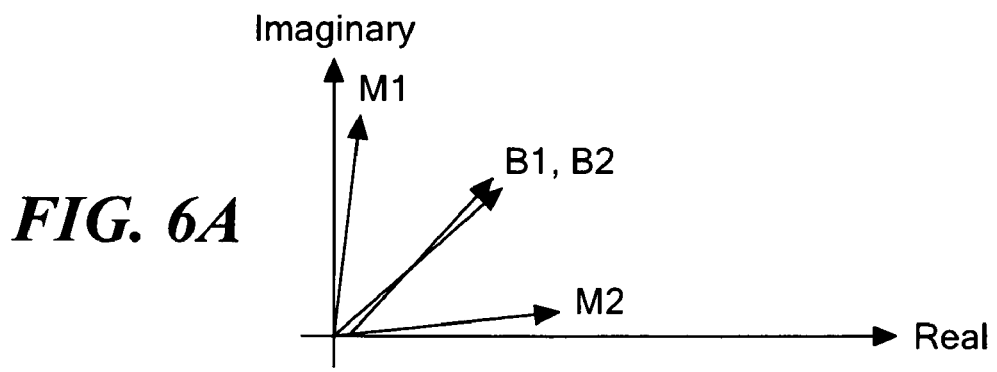

Referring now to FIG. 6A, a graph shows vectors representative of received target echoes subsequent to those of FIG. 6, after the phase calibration value, (p, has been applied to the transmitted pulses (not shown) in order to align the phases of the two bistatic target echoes B1 and B2.

Figure 6B:
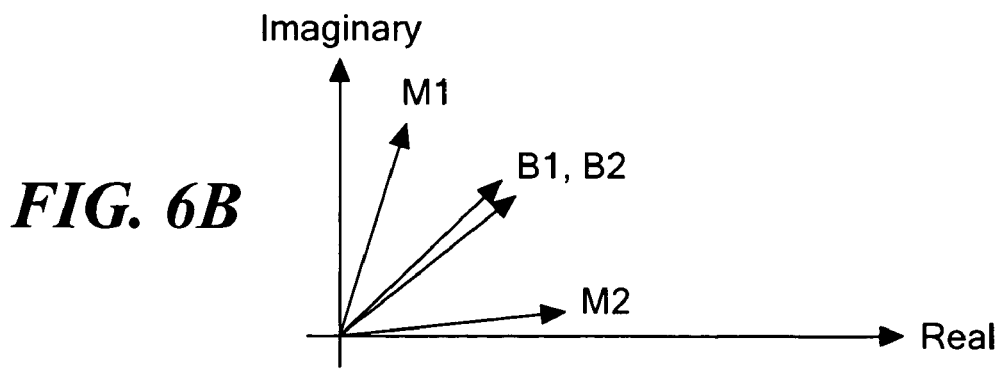

Referring now to FIG. 6B, a graph shows vectors representative of received target echoes subsequent to those of FIG. 6A, after the range calibration value, R, has been applied to transmitted pulse (not shown) in order to further align the phases of the two bistatic target echoes indicated by vectors B1 and B2. The range calibration value can correspond merely to a multiple of three hundred sixty degrees, resulting in the same aligned phases as the two bistatic target echoes B1 and B2 seen in FIG. 6A.

Therefore, it should be appreciated that the vector relationships shown in FIG. 6A do not change significantly after the range calibrations are applied as in FIG. 6B. It is assumed that modern radars will be used in which digital waveform generators allow independent control of both start time and phase. Thus, the calibration process need be done only once during the track. It will be appreciated tat the phase and range calibration values are generally used concurrently.

Figure 7:
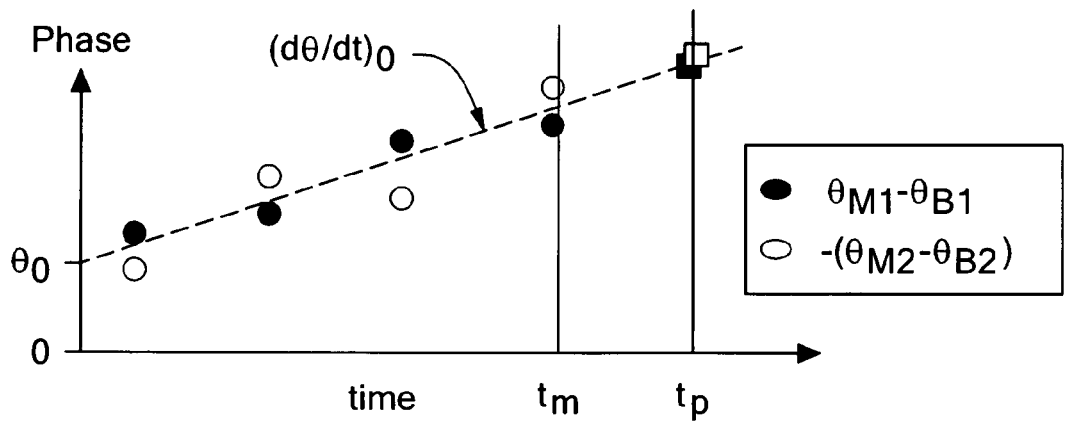
FIGS. 7-7A are graphs showing a pictorial representation associated with the initialization method of FIGS. 4B and 4C.

Referring now to FIG. 7, a graph shows generation of a predicted phase initialization value as in block 314 of FIG. 4 and block 452 of FIG. 4C. A horizontal scale corresponds to time and a vertical scale corresponds to phase difference between monostatic and bistatic target echoes received at the paired radar and at the reference radar. Solid data points represent the phase difference at the paired radar and unfilled circle data points represent the phase difference at the reference radar corresponding to a plurality of radar pulses transmitted by the paired radar and by the reference radar. As few as two radar pulses are required to determine the initial phase and phase rate parameters between radars. However, as shown, more than two pulses may be used to improve the accuracy of the parameter estimates. The last measured data points are taken at a time, $t_m$.

Unlike the phase differences plotted in FIG. 5 between the bistatic target echoes received by the paired radar and the reference radar, which have a substantially constant phase difference even for a moving target, the phase differences plotted in FIG. 7 between monostatic and bistatic target echoes are not constant and change with a moving target as shown.

A least squares fit line can be generated having the slope $(d\theta/dt)_0$ as shown. The least squares fit line, which is based upon data points from both radars, can then be used to predict the expected phase difference associated with next transmitted radar signals from the paired radar and the reference radar that would occur at a time, $t_p$. The predicted phase for each radar at time, $t_p$, is represented in FIG. 7 by a corresponding square.

A phase along the least squares fit line at the time, $t_p$, corresponds to the predicted phase initialization value described above in conjunction with box 452 of FIG. 4C.

Figure 7A:
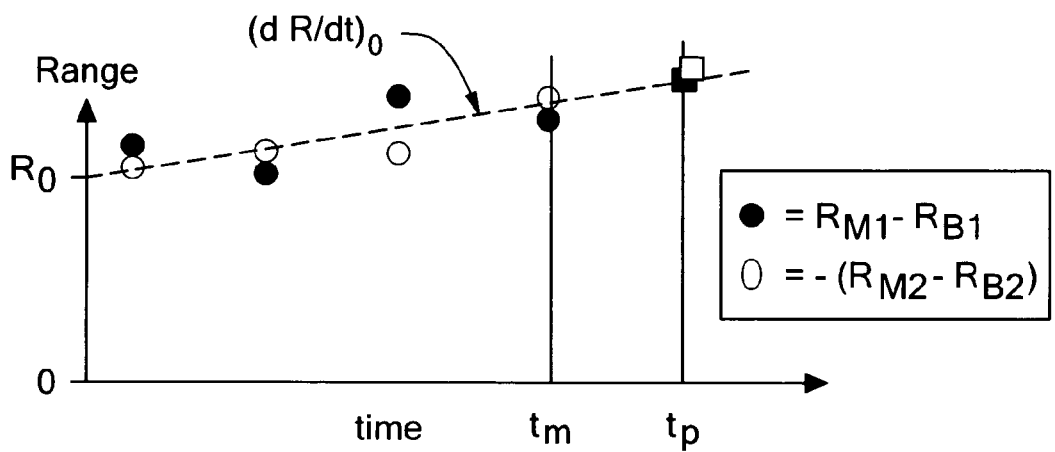

Referring now to FIG. 7A, a graph pictorially shows generation of a range initialization value as in block 314 of FIG. 4 and in block 454 of FIG. 4C. A horizontal scale corresponds to time and a vertical scale corresponds to range (time delay) difference between monostatic and bistatic target echoes received at the paired radar and at the reference radar. Solid data points represent the range difference measurements made at the paired radar and unfilled circle data points represent the range difference measurements made at the same time at the reference radar corresponding to a plurality of radar pulses transmitted by the paired radar and by the reference radar. Both range and phase difference can be measured at each radar for each pulse during initialization, so separate pulse trains are not needed for generating the initial phase and range predictions. The last measured data points are taken at the time, $t_m$.

Unlike the range (time delay) differences plotted in FIG. 5A between the bistatic target echoes received by the paired radar and the reference radar, which have a substantially constant range difference even for a moving target, the range differences plotted in FIG. 7 between the monostatic and bistatic target echoes are not constant and change with a moving target as shown.

A least squares fit line can be generated having the slope $(dR/dt)_0$ as shown. The least squares fit line can be used to predict the expected range (time delay) difference associated with next transmitted radar signals from the paired radar and the reference radar that would occur at the time, $t_p$. The predicted range difference for each of the two radars is represented by a corresponding square.

A range along the least squares fit line at the time, $t_p$, corresponds the predicted range initialization value described above in conjunction with box 454 of FIG. 4C.

Figure 8:
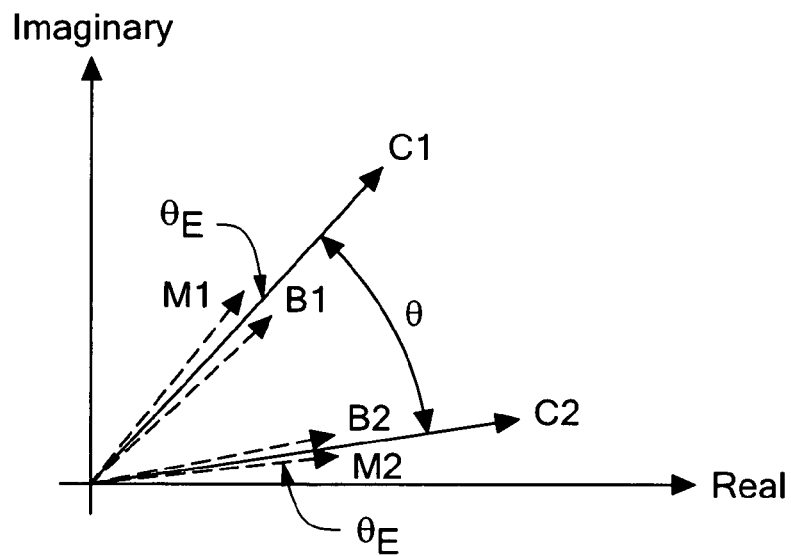
FIGS. 8-8C are graphs showing a pictorial representation associated with the coherence maintenance method of FIG. 4D.

Referring now to FIG. 8, a vector diagram shows target echoes received at the paired radar and the reference radar, respectively, when the above-described phase calibration value, range calibration value, phase initialization value, and range initialization value are first applied to the pulses transmitted by the paired radar, i.e., after the calibration and initialization functions. A monostatic target echo, M1 and a bistatic target echo, B1, are received by the paired radar and a monostatic target echo, M2, and a bistatic target echo, B2, are received by the reference radar. With the above described initialization values applied to the transmitted pulses (and also the above-described calibration values), the monostatic target echo, M1, and the bistatic target echo, B1, and also the monostatic target echo, M2, and the bistatic target echo B2 overlap in time and also generally in phase, as shown also, for example, in FIG. 2D. Since the monostatic and bistatic target echoes overlap in time and phase, the received signal at the paired radar is a composite signal represented as a vector, C1, and the received signal at the reference radar is a composite signal represented as a vector, C2.

It will be recognized that the monostatic target echo, M1, does not necessarily align perfectly in phase with the bistatic target echo, B1, and therefore, the first composite vector, C1, is not necessarily a fully coherent addition of the two signals. Similarly, it will be recognized that the monostatic target echo, M2, does not necessarily align perfectly in phase with the bistatic target echo, B2, and therefore, the second composite signal, C2, is not necessarily a fully coherent addition of the two signals. A phase difference between monostatic target echoes and bistatic target echoes is represented as a residual phase error $\theta_E$. Here, $\theta_E$ is the difference between the predicted phase between radars (used to set the relative phase between the last pair of transmitted pulses) and the actual phase between radars (measured by comparing the composite vectors, C1 and C2, after the most recent transmitted pulses have been received). As discussed above, the phase error, $\theta_E$, is responsible for the lack of perfect coherence on transmit and cannot be recovered by further processing. Instead, $\theta_E$, is used to correct the phase rate used for the next phase prediction, as described earlier, so as to drive the coherence loss on transmit as close to zero as the finite SNR of the measurements permits.

While the phase angle, $\theta_E$, cannot be directly measured, it can be obtained as described below, by measuring the phase angle, $\theta$, between the two composite signals, C1 and C2, and comparing that measurement with the predicted phase angle, $\theta_P$, generated at the time of the previous pulse pair.

Figure 8A:
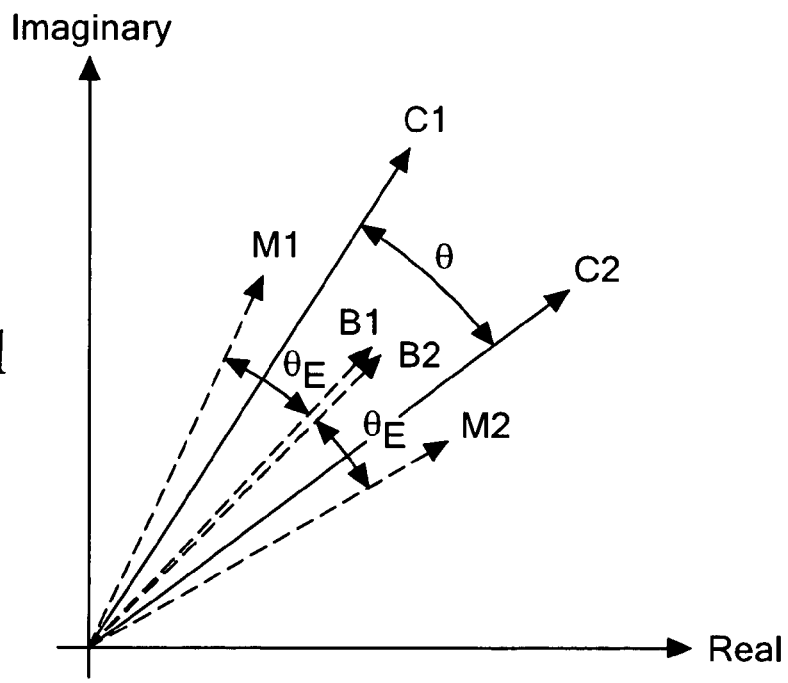

Referring now to FIG. 8A, as described above, the last phase prediction, $\theta_P$, is subtracted in accordance with block 504 of FIG. 4D from the phase difference between the composite vectors, in order to identify the residual phase error, $\theta_E$.

Figure 8B:
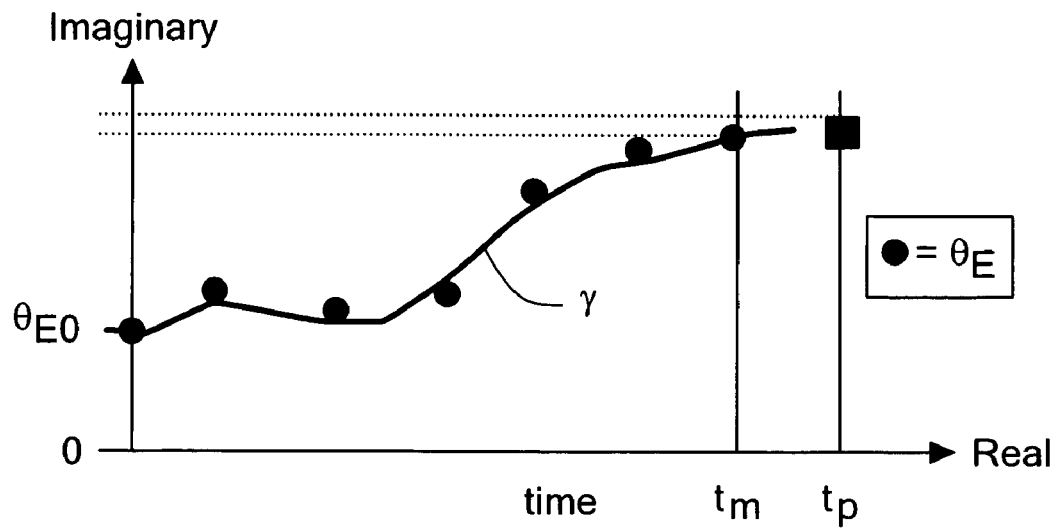

Referring now to FIG. 8B, a graph has a horizontal scale in units of time and a vertical scale in units of phase angle. Solid dots correspond to residual phase error, $\theta_E$, obtained in conjunction with a number of transmitted and received radar pulses, as described above in conjunction with FIG. 8A. The residual phase errors measured in conjunction with the number of transmitted and received radar pulses can provide a composite signal phase relationship in accordance with blocks 506 and 522 of FIG. 4D, typified by a curve denoted γ. A square at a time, $t_p$, corresponds to a next predicted phase error that would occur in conjunction with a pulse pair transmitted at the time, $t_p$, which can be used to generate a next predicted phase applied to the paired radar for the next pulse pair.

It will be appreciated that the curve, γ, and the predicted phase error at the future time, tp, can be generated by the phase rate filter 262 of FIG. 3, and therefore, the phase rate filter 262 in conjunction with the composite signal phase/range prediction processor 258 (FIG. 3) can provide a phase estimate associated with a next transmitted pulse pair at the time, $t_p$, taking into account measured phase errors associated with previous transmitted pulse pairs, which are shown as the solid dots.

Essentially, the new predicted residual phase error can be used to generate a new composite phase value to adjust the phase of the next radar pulse transmitted by the paired radar.

Figure 8C:
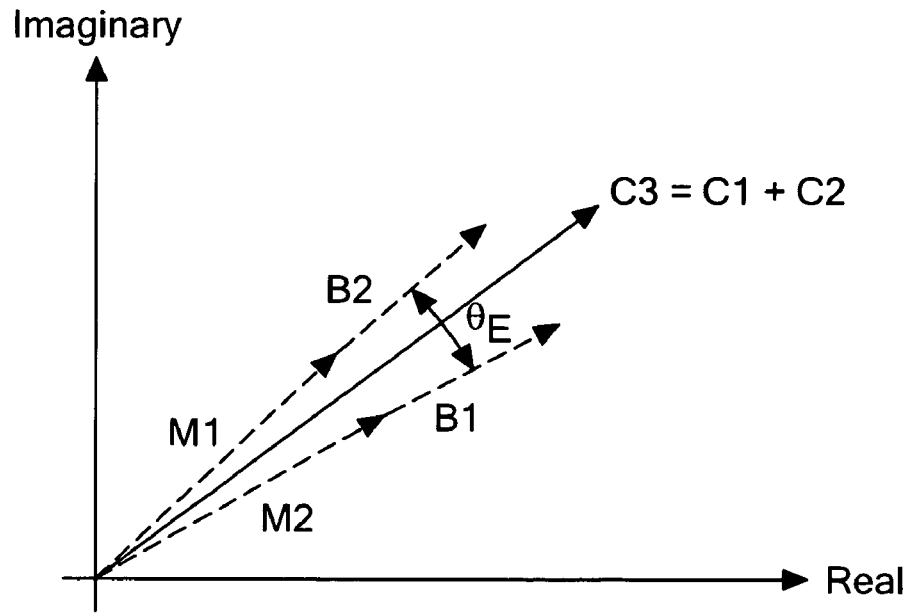

Referring now to FIG. 8C, the phase difference, θ, between the composite vectors, C1, C2, from the last pulse as in FIG. 8A can be measured in both radars and the signals represented by the vectors, C1 and C2, can be phase rotated so that they add in phase (cohering on receive) to generate a cohered on receive signal represented by a vector, C3.

The above-described process is repeated for the next pair of transmitted pulses and so on until the target leaves a radar coverage zone. The processing of each pulse pair produces a predicted residual phase error value, $\theta_E$, associated with a change that actually took place in the phase between radars since the last pulse pair was processed, and therefore gives the actual phase rate. The actual phase rate is used to update the phase rate filter 262 of FIG. 3 and then to compute the actual range rate so that the change in range between radars can be computed and accounted for when setting up the relative range and phase offsets between radars for the next pulse pair.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of calibrating a plurality of radars, the plurality of radars for use together in a radar system, the method of calibrating the plurality of radars comprising:
   selecting a reference radar from among the plurality of radars;
   selecting one or more pairs of radars, each one of the pairs of radars including the reference radar and a respective paired radar from among the plurality of radars;
   generating calibration values associated with the reference radar and with the paired radar;
   generating initialization values associated with the reference radar and with the paired radar;
   transmitting an adjusted signal with the paired radar and an unadjusted signal with the reference radar, the adjusted signal generated in accordance with the initialization values and the calibration values;
   receiving a first composite signal with the reference radar and a second composite signal with the paired radar, the first and second composite signals associated with the adjusted signal and the unadjusted signal; and
   coherently summing the first composite signal and the second composite signal to provide a final signal.

2. The method of claim 1, wherein the generating calibration values includes:
   transmitting one or more calibration signals with the reference radar and one or more calibration signals with the paired radar;
   receiving respective bistatic target echoes with the reference radar;
   receiving respective bistatic target echoes with the paired radar, wherein the reference radar bistatic target echoes and the paired radar bistatic target echoes are associated with the one or more calibration signals transmitted by the reference radar and with the one or more calibration signals transmitted by the paired radar;
   generating a phase calibration relationship in accordance with a phase between the bistatic target echoes received by the reference radar and the bistatic target echoes received by the paired radar; and
   generating a range calibration relationship in accordance with a time delay between the bistatic target echoes received by the reference radar and the bistatic target echoes received by the paired radar.

3. The method of claim 1, wherein the generating initialization values includes:
   transmitting one or more initialization signals with the reference radar and one or more initialization signals with the paired radar;
   receiving respective monostatic and bistatic target echoes with the reference radar;
   receiving respective monostatic and bistatic target echoes with the paired radar, wherein the reference radar monostatic and bistatic target echoes and the paired radar monostatic and bistatic target echoes are associated with the one or more initialization signals transmitted by the reference radar and with the one or more initialization signals transmitted by the paired radar;
   generating a phase initialization relationship in accordance with a phase between the monostatic and bistatic target echoes received by the reference radar and a phase between the monostatic and bistatic target echoes received by the paired radar; and
   generating a range initialization relationship in accordance with a time delay between monostatic and bistatic target echoes received by the reference radar and a time delay between the monostatic and bistatic target echoes received by the paired radar.

4. The method of claim 3, wherein at least one of the phase initialization relationship and the range initialization relationship are generated in association with a least squares linear fit.

5. The method of claim 3, further including predicting a range initialization value associated with the range initialization relationship and a phase initialization value associated with the phase initialization relationship.

6. The method of claim 3, wherein the transmitting the adjusted signal with the paired radar and the unadjusted signal with the reference radar includes:
predicting a phase initialization value associated with the phase initialization relationship;
predicting a range initialization value associated with the range initialization relationship; and
adjusting a relative phase and a time delay of the paired radar relative to the reference radar in accordance with the phase initialization value and the range initialization value.

7. The method of claim 1, wherein the coherently summing the first composite signal and the second composite signal includes:
measuring a phase between the first composite signal and the second composite signal;
aligning a relative phase of the first and second composite signals to provide an aligned first composite signal and an aligned second composite signal in accordance with the measured phase between the first composite signal and the second composite signal; and
adding the aligned first and second composite signals.

8. The method of claim 7, wherein the coherently summing further includes:
measuring a residual phase error according to the phase between the first composite signal and the second composite signal;
generating a composite signal phase relationship in accordance with the residual phase error; and
predicting a composite phase value from the composite signal phase relationship.

9. The method of claim 8, wherein the composite signal phase relationship comprises an alpha function.

10. The method of claim 8, further including:
transmitting a second adjusted signal with the paired radar and the unadjusted signal with the reference radar, the second adjusted signal generated in accordance with the initialization values, the calibration values, and the composite phase value;
receiving a third composite signal with the reference radar and a fourth composite signal with the paired radar, the third and fourth composite signals associated with the second adjusted signal and the unadjusted signal; and
coherently summing the third and fourth composite signals to provide a second final signal.

11. The method of claim 10, wherein the coherently summing the third and fourth composite signals includes:
measuring a phase between the third composite signal and the fourth composite signal;
aligning a relative phase of the third and fourth composite signals to provide an aligned third composite signal and an aligned fourth composite signal in accordance with the measured phase between the third composite signal and the fourth composite signal; and
adding the aligned third and fourth composite signals.

12. The method of claim 11, wherein the coherently summing the third and fourth composite signals further includes:
measuring a second residual phase error according to the phase between the third composite signal and the fourth composite signal;
updating the composite signal phase relationship in accordance with the second residual phase error; and
predicting an updated composite phase value from the updated composite signal phase relationship.

13. Apparatus to calibrate a plurality of radars, the plurality of radars for use together in a radar system, the apparatus to calibrate the plurality of radars comprising:
an association processor to associate at least one respective target track provided by each of a pair of radars from among the plurality of radars including a reference radar and a paired radar;
a calibration processor coupled to the association processor to provide calibration values associated with the pair of radars;
an initialization processor coupled to the calibration processor to provide initialization values associated with the pair of radars; and
a coherence maintenance processor coupled to the initialization processor to adjust at least one of a first signal transmitted by the reference radar and a second signal transmitted by the paired radar in accordance with the initialization values and with the calibration values, and to coherently sum a first composite signal received by the reference radar with a second composite signal received by the paired radar.

14. The apparatus of claim 13, wherein the calibration processor includes:
a phase calibration processor coupled to the association processor to generate a phase calibration relationship in accordance with a phase between bistatic target echoes received by the reference radar and by the paired radar and to generate a phase calibration value; and
a range calibration processor coupled to the association processor to generate a range calibration relationship in accordance with a time delay between the bistatic target echoes received by the reference radar and by the paired radar and to generate a range calibration value.

15. The apparatus of claim 13, wherein the initialization processor includes:
a phase prediction processor coupled to the calibration processor to generate a phase initialization relationship in accordance with a phase between monostatic and bistatic target echoes received by the reference radar and a phase between monostatic and bistatic target echoes received by the paired radar; and
a range prediction processor coupled to the calibration processor to generate a range initialization relationship in accordance with a time delay between the monostatic and bistatic target echoes received by the reference radar and a time delay between the monostatic and bistatic target echoes received by the paired radar.

16. The apparatus of claim 15, wherein the phase prediction processor and the range prediction processor each comprise a respective least squares fit processor.

17. The apparatus of claim 15, wherein the phase prediction processor is further to generate a phase initialization value in accordance with the phase initialization relationship and to generate a range initialization value in accordance with the range initialization relationship.

18. The apparatus of claim 13, wherein the coherence maintenance processor includes:
a measurement processor to measure a phase between the first composite signal and the second composite signal;
a phase rate filer coupled to the measurement processor to generate a composite signal phase relationship; and
a prediction processor coupled to the phase rate filter to predict a composite phase value in accordance with the composite signal phase relationship.

19. The apparatus of claim 18, wherein the phase rate filter comprises an alpha function filter.

20. The apparatus of claim 18, wherein the phase rate filter comprises a Kalman filter.

21. The apparatus of claim 18, wherein the phase rate filter comprises a least squares fit processor.

22. Apparatus to calibrate a plurality of radars, the plurality of radars for use together in a radar system, the apparatus to calibrate the plurality of radars comprising:

an association processor to associate at least one respective target track provided each of a pair of radars from among the plurality of radars including a reference radar and a paired radar;

a calibration processor coupled to the association processor, including:

a phase calibration processor to generate a phase calibration relationship between the bistatic target echoes received by the reference radar and by the paired radar and to generate a phase calibration value; and a range calibration processor to generate a range calibration relationship between the bistatic target echoes received by the reference radar and by the paired radar and to generate a range calibration value;

an initialization processor coupled to the calibration processor, including:

a phase prediction processor coupled to the calibration processor to generate a phase initialization relationship in accordance with a phase between monostatic and bistatic target echoes received by the reference radar and a phase between monostatic and bistatic target echoes received by the paired radar; and a range prediction processor coupled to the calibration processor to generate a range initialization relationship in accordance with a time delay between the monostatic and bistatic target echoes received by the reference radar and a time delay between the monostatic and bistatic target echoes received by the paired radar; and a coherence maintenance processor coupled to the initialization processor to adjust at least one of a first signal transmitted by the reference radar and a second signal transmitted by the paired radar in accordance with the phase initialization value, the range initialization value, the phase calibration value, and the range calibration value, and to coherently sum a first composite signal received by the reference radar with a second composite signal received by the paired radar, the coherency processor including:

a measurement processor to measure a phase between the first composite signal and the second composite signal;

a phase rate filer coupled to the measurement processor to generate a composite signal phase relationship; and a prediction processor coupled to the phase rate filter to predict a composite phase value in accordance with the composite signal phase relationship.

* * * * *

UNITED STATES PATENT AND TRADEMARK OFFICE
CERTIFICATE OF CORRECTION

PATENT NO.         : 7,358,892 B2
APPLICATION NO.    : 11/376934
DATED              : April 15, 2008
INVENTOR(S)        : Thome et al.

It is certified that error appears in the above-identified patent and that said Letters Patent is hereby corrected as shown below:

Column 2, line 51 delete "signals" and replace with --signal--.

Column 3, line 9 delete "FO" and replace with --OF--.

Column 3, line 55 delete "associated the" and replace with --associated with the--.

Column 6, line 21 delete "longer be possible" and replace with --longer possible--.

Column 7, line 5 delete "is" and replace with --is an--.

Column 7, line 40 delete "above describe" and replace with --above-described--.

Column 8, line 21 delete "above described" and replace with --above-described--.

Column 9, line 5 delete "above described" and replace with --above-described--.

Column 9, line 52 delete "system" and replace with --system 269.--.

Column 10, line 27 delete "and" and replace with --as--.

Column 11, line 51 delete "that the" and replace with --the--.

Column 17, line 3 delete "a perfect predictions," and replace with
--perfect predictions,--.

Column 19, line 3 delete ", (p," and replace with --,φ,--.

Column 19, line 21 delete "tat" and replace with --that--.

Column 20, line 32 delete "above described" and replace with --above-described--.

Column 24, line 63 delete "filer" and replace with --filter--.

UNITED STATES PATENT AND TRADEMARK OFFICE
CERTIFICATE OF CORRECTION

PATENT NO. : 7,358,892 B2
APPLICATION NO. : 11/376934
DATED : April 15, 2008
INVENTOR(S) : Thome et al.

It is certified that error appears in the above-identified patent and that said Letters Patent is hereby corrected as shown below:

Column 26, line 23 delete "filer" and replace with --filter--.

Signed and Sealed this

Thirtieth Day of September, 2008

JON W. DUDAS
*Director of the United States Patent and Trademark Office*